United States Patent
Schein et al.

(10) Patent No.: US 8,453,174 B2
(45) Date of Patent: May 28, 2013

(54) METHOD AND SYSTEM FOR DISPLAYING ADVERTISING, VIDEO, AND PROGRAM SCHEDULE LISTING

(75) Inventors: Steven M. Schein, Menlo Park, CA (US); James J. Leftwich, Palo Alto, CA (US); David M. Folker, Fremont, CA (US); Keith Hunwick, Mountain View, CA (US); Theresa Alba, Fremont, CA (US); Molly K. King, Fremont, CA (US)

(73) Assignee: Starsight Telecast, Inc., Fremont, CA (US)

( * ) Notice: Subject to any disclaimer, the term of this patent is extended or adjusted under 35 U.S.C. 154(b) by 40 days.

(21) Appl. No.: 12/818,012

(22) Filed: Jun. 17, 2010

(65) Prior Publication Data

US 2011/0041150 A1    Feb. 17, 2011

Related U.S. Application Data

(63) Continuation of application No. 11/894,687, filed on Aug. 20, 2007, now Pat. No. 8,181,200, which is a continuation of application No. 11/502,691, filed on Aug. 11, 2006, now abandoned, which is a continuation of application No. 10/406,745, filed on Apr. 3, 2003, now abandoned, which is a continuation of application No. 09/962,692, filed on Sep. 25, 2001, now abandoned, which is a continuation of application No. 08/847,726, filed on Apr. 28, 1997, now Pat. No. 6,323,911, which is a continuation-in-part of application No. 08/537,650, filed on Oct. 2, 1995, now abandoned.

(60) Provisional application No. 60/023,651, filed on Jun. 17, 1996.

(51) Int. Cl.
    *H04N 7/10*    (2006.01)

(52) U.S. Cl.
    USPC ............................................ 725/36; 348/552

(58) Field of Classification Search
    USPC ............... 725/3–612; 709/217–231; 348/552, 348/563–565, 906
    See application file for complete search history.

(56) References Cited

U.S. PATENT DOCUMENTS

| 3,440,427 A | 4/1969 | Kammer |
| 3,492,577 A | 1/1970 | Reiter et al. |

(Continued)

FOREIGN PATENT DOCUMENTS

| AU | 731010 | 7/1998 |
| AU | 733993 | 2/1999 |

(Continued)

OTHER PUBLICATIONS

U.S. Appl. No. 09/330,792, filed Jun. 11, 1999, Knudson et al.

(Continued)

*Primary Examiner* — Annan Shang
(74) *Attorney, Agent, or Firm* — Ropes & Gray LLP

(57) ABSTRACT

A television schedule system and method for displaying television schedule information on a television screen includes a program guide having a schedule information area that depicts the programs that are being presented on each channel at each time during the day. An input device allows the viewer to browse through the schedule information area and/or obtain more information about programs of particular interest. In one aspect, the viewer may watch a program on the currently-tuned channel, while browsing through the other channels on a portion of the television screen. In another aspect, the viewer may watch programs currently being shown on the television, while he or she browses through the program guide. In yet another aspect, the system includes a database, a processor and associated software for automatically customizing the television schedule guide to an individual viewer or a group of viewers, e.g., a family, to facilitate use of the television schedule.

20 Claims, 23 Drawing Sheets

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,024,401 A | 5/1977 | Bernstein et al. |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,280,148 A | 7/1981 | Saxena |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,625,080 A | 11/1986 | Scott |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,761,684 A | 8/1988 | Clark et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,719 A | 9/1990 | Strubbe et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |

| | | | | | | |
|---|---|---|---|---|---|---|
| 4,992,940 A | 2/1991 | Dworkin | | 5,283,639 A | 2/1994 | Esch et al. |
| 4,995,078 A | 2/1991 | Monslow et al. | | 5,283,819 A | 2/1994 | Glick et al. |
| 4,996,642 A | 2/1991 | Hey | | 5,301,028 A | 4/1994 | Banker et al. |
| 4,998,171 A | 3/1991 | Kim et al. | | 5,307,173 A | 4/1994 | Yuen et al. |
| 5,008,853 A | 4/1991 | Bly et al. | | 5,311,423 A | 5/1994 | Clark |
| 5,014,125 A | 5/1991 | Pocock et al. | | 5,313,282 A | 5/1994 | Hayashi |
| 5,016,273 A | 5/1991 | Hoff | | 5,317,403 A | 5/1994 | Keenan |
| 5,027,400 A | 6/1991 | Baji et al. | | 5,319,445 A | 6/1994 | Fitts |
| 5,036,314 A | 7/1991 | Barillari et al. | | 5,323,234 A | 6/1994 | Kawasaki |
| 5,038,211 A | 8/1991 | Hallenbeck | | 5,323,240 A | 6/1994 | Amano et al. |
| 5,045,947 A | 9/1991 | Beery | | 5,325,183 A | 6/1994 | Rhee |
| 5,047,867 A | 9/1991 | Strubbe et al. | | 5,325,423 A | 6/1994 | Lewis |
| 5,058,160 A | 10/1991 | Banker et al. | | 5,335,277 A | 8/1994 | Harvey et al. |
| 5,062,060 A | 10/1991 | Kolnick | | 5,343,239 A | 8/1994 | Lappington et al. |
| 5,068,734 A | 11/1991 | Beery | | 5,347,167 A | 9/1994 | Singh |
| 5,072,412 A | 12/1991 | Henderson, Jr. et al. | | 5,347,632 A | 9/1994 | Filepp et al. |
| 5,075,771 A | 12/1991 | Hashimoto | | 5,351,075 A | 9/1994 | Herz et al. |
| 5,083,800 A | 1/1992 | Lockton | | 5,353,121 A | 10/1994 | Young et al. |
| 5,089,885 A | 2/1992 | Clark | | 5,357,276 A | 10/1994 | Banker et al. |
| 5,090,049 A | 2/1992 | Chen | | 5,359,367 A | 10/1994 | Stockill |
| 5,091,785 A | 2/1992 | Canfield et al. | | 5,359,601 A | 10/1994 | Wasilewski et al. |
| 5,093,921 A | 3/1992 | Bevins, Jr. | | 5,365,282 A | 11/1994 | Levine |
| 5,099,319 A | 3/1992 | Esch et al. | | 5,367,316 A | 11/1994 | Ikezaki |
| 5,103,314 A | 4/1992 | Keenan | | 5,367,330 A | 11/1994 | Haave et al. |
| 5,105,184 A | 4/1992 | Pirani et al. | | 5,373,288 A | 12/1994 | Blahut |
| 5,113,259 A | 5/1992 | Romesburg et al. | | 5,374,951 A | 12/1994 | Welsh |
| 5,119,188 A | 6/1992 | McCalley et al. | | 5,377,317 A | 12/1994 | Bates et al. |
| 5,121,476 A | 6/1992 | Yee | | 5,377,319 A | 12/1994 | Kitahara et al. |
| 5,123,046 A | 6/1992 | Levine | | 5,382,983 A | 1/1995 | Kwoh et al. |
| 5,126,851 A | 6/1992 | Yoshimura | | 5,384,910 A | 1/1995 | Torres |
| 5,132,992 A | 7/1992 | Yurt et al. | | 5,387,945 A | 2/1995 | Takeuchi |
| 5,148,154 A | 9/1992 | MacKay et al. | | 5,396,546 A | 3/1995 | Remillard |
| 5,151,782 A | 9/1992 | Ferraro | | 5,398,074 A | 3/1995 | Duffield et al. |
| 5,151,789 A | 9/1992 | Young | | 5,398,138 A | 3/1995 | Tomita |
| 5,155,591 A | 10/1992 | Wachob | | 5,404,393 A | 4/1995 | Remillard |
| 5,155,806 A | 10/1992 | Hoeber et al. | | 5,410,326 A | 4/1995 | Goldstein |
| 5,157,768 A | 10/1992 | Hoeber et al. | | 5,410,343 A | 4/1995 | Coddington et al. |
| 5,161,023 A | 11/1992 | Keenan | | 5,410,344 A | 4/1995 | Graves et al. |
| 5,162,905 A | 11/1992 | Itoh et al. | | 5,410,367 A | 4/1995 | Zahavi et al. |
| 5,170,388 A | 12/1992 | Endoh | | 5,412,720 A | 5/1995 | Hoarty |
| 5,172,111 A | 12/1992 | Olivo, Jr. | | 5,414,756 A | 5/1995 | Levine |
| 5,177,604 A | 1/1993 | Martinez | | 5,416,508 A | 5/1995 | Sakuma et al. |
| 5,179,439 A | 1/1993 | Hashimoto et al. | | 5,420,858 A | 5/1995 | Marshall et al. |
| 5,179,654 A | 1/1993 | Richards et al. | | 5,424,770 A | 6/1995 | Schmelzer et al. |
| 5,189,630 A | 2/1993 | Barstow et al. | | 5,425,101 A | 6/1995 | Woo et al. |
| 5,191,423 A | 3/1993 | Yoshida et al. | | 5,432,561 A | 7/1995 | Strubbe |
| 5,195,092 A | 3/1993 | Wilson et al. | | 5,434,626 A | 7/1995 | Hayashi et al. |
| 5,195,134 A | 3/1993 | Inoue et al. | | 5,436,676 A | 7/1995 | Pint et al. |
| 5,200,823 A | 4/1993 | Yoneda et al. | | 5,438,355 A | 8/1995 | Palmer |
| 5,204,897 A | 4/1993 | Wyman | | 5,438,372 A | 8/1995 | Tsumori et al. |
| 5,206,722 A | 4/1993 | Kwan | | 5,440,678 A | 8/1995 | Eisen et al. |
| 5,210,611 A | 5/1993 | Yee et al. | | 5,444,499 A | 8/1995 | Saitoh |
| 5,212,553 A | 5/1993 | Maruoka | | 5,446,919 A | 8/1995 | Wilkins |
| 5,214,622 A | 5/1993 | Nemoto et al. | | 5,452,012 A | 9/1995 | Saitoh |
| 5,216,515 A | 6/1993 | Steele et al. | | 5,455,570 A | 10/1995 | Cook et al. |
| 5,220,420 A | 6/1993 | Hoarty et al. | | 5,459,522 A | 10/1995 | Pint |
| 5,223,924 A | 6/1993 | Strubbe | | 5,461,415 A | 10/1995 | Wolf et al. |
| 5,227,874 A | 7/1993 | Von Kohorn | | 5,465,113 A | 11/1995 | Gilboy |
| 5,231,493 A | 7/1993 | Apitz | | 5,465,385 A | 11/1995 | Ohga et al. |
| 5,231,494 A | 7/1993 | Wachob | | 5,469,206 A | 11/1995 | Strubbe et al. |
| RE34,340 E | 8/1993 | Freeman | | 5,477,262 A | 12/1995 | Banker et al. |
| 5,233,423 A | 8/1993 | Jernigan et al. | | 5,479,266 A | 12/1995 | Young et al. |
| 5,233,654 A | 8/1993 | Harvey et al. | | 5,479,268 A | 12/1995 | Young et al. |
| 5,235,415 A | 8/1993 | Bonicel et al. | | 5,479,497 A | 12/1995 | Kovarik |
| 5,236,199 A | 8/1993 | Thompson, Jr. | | 5,481,296 A | 1/1996 | Cragun et al. |
| 5,237,411 A | 8/1993 | Fink et al. | | 5,483,278 A | 1/1996 | Strubbe et al. |
| 5,237,417 A | 8/1993 | Hayashi et al. | | 5,485,197 A | 1/1996 | Hoarty |
| 5,237,418 A | 8/1993 | Kaneko | | 5,485,219 A | 1/1996 | Woo |
| 5,239,540 A | 8/1993 | Rovira et al. | | 5,485,221 A | 1/1996 | Banker et al. |
| 5,245,420 A | 9/1993 | Harney et al. | | 5,488,409 A | 1/1996 | Yuen et al. |
| 5,247,347 A | 9/1993 | Litteral et al. | | 5,495,295 A | 2/1996 | Long |
| 5,247,364 A | 9/1993 | Banker et al. | | 5,502,504 A | 3/1996 | Marshall et al. |
| 5,247,580 A | 9/1993 | Kimura et al. | | 5,515,098 A | 5/1996 | Carles |
| 5,253,066 A | 10/1993 | Vogel | | 5,515,106 A | 5/1996 | Chaney et al. |
| 5,253,067 A | 10/1993 | Chaney et al. | | 5,515,511 A | 5/1996 | Nguyen et al. |
| 5,260,778 A | 11/1993 | Kauffman et al. | | 5,517,254 A | 5/1996 | Monta et al. |
| 5,260,788 A | 11/1993 | Takano et al. | | 5,517,256 A | 5/1996 | Hashimoto |
| 5,260,999 A | 11/1993 | Wyman | | 5,521,589 A | 5/1996 | Mondrosch et al. |
| 5,262,860 A | 11/1993 | Fitzpatrick et al. | | 5,523,794 A | 6/1996 | Mankovitz et al. |

| | | | | | | |
|---|---|---|---|---|---|---|
| 5,523,796 A | 6/1996 | Marshall et al. | | 5,652,615 A | 7/1997 | Bryant et al. |
| 5,524,195 A | 6/1996 | Clanton, III et al. | | 5,654,748 A | 8/1997 | Matthews, III |
| 5,526,034 A | 6/1996 | Hoarty et al. | | 5,654,886 A | 8/1997 | Zereski, Jr. et al. |
| 5,528,304 A | 6/1996 | Cherrick et al. | | 5,657,072 A | 8/1997 | Aristides et al. |
| 5,532,735 A | 7/1996 | Blahut et al. | | 5,657,091 A | 8/1997 | Bertram |
| 5,532,754 A | 7/1996 | Young et al. | | 5,659,350 A | 8/1997 | Hendricks et al. |
| 5,534,911 A | 7/1996 | Levitan | | 5,659,366 A | 8/1997 | Kerman |
| 5,537,141 A | 7/1996 | Harper et al. | | 5,661,516 A | 8/1997 | Carles |
| 5,539,822 A | 7/1996 | Lett | | 5,661,517 A | 8/1997 | Budow et al. |
| 5,541,662 A | 7/1996 | Adams et al. | | 5,663,757 A | 9/1997 | Morales |
| 5,541,738 A | 7/1996 | Mankovitz | | 5,664,111 A | 9/1997 | Nahan et al. |
| 5,550,576 A | 8/1996 | Klosterman | | 5,666,293 A | 9/1997 | Metz et al. |
| 5,550,863 A | 8/1996 | Yurt et al. | | 5,666,498 A | 9/1997 | Amro |
| 5,554,161 A | 9/1996 | Thibeault | | 5,666,645 A | 9/1997 | Thomas et al. |
| 5,557,338 A | 9/1996 | Maze et al. | | 5,671,276 A | 9/1997 | Eyer et al. |
| 5,557,721 A | 9/1996 | Fite et al. | | 5,671,411 A | 9/1997 | Watts et al. |
| 5,559,548 A | 9/1996 | Davis et al. | | 5,675,390 A | 10/1997 | Schindler et al. |
| 5,559,549 A | 9/1996 | Hendricks et al. | | 5,675,752 A | 10/1997 | Scott et al. |
| 5,559,550 A | 9/1996 | Mankovitz | | 5,677,708 A | 10/1997 | Matthews, III et al. |
| 5,559,942 A | 9/1996 | Gough et al. | | 5,677,981 A | 10/1997 | Kato et al. |
| 5,561,471 A | 10/1996 | Kim et al. | | 5,682,195 A | 10/1997 | Hendricks et al. |
| 5,561,709 A | 10/1996 | Remillard | | 5,682,206 A | 10/1997 | Wehmeyer et al. |
| 5,563,665 A | 10/1996 | Chang | | 5,682,525 A | 10/1997 | Bouve et al. |
| 5,570,295 A | 10/1996 | Isenberg et al. | | 5,686,954 A | 11/1997 | Yoshinobu et al. |
| 5,572,442 A | 11/1996 | Schulhof et al. | | 5,687,331 A | 11/1997 | Volk et al. |
| 5,574,962 A | 11/1996 | Fardeau et al. | | 5,689,648 A | 11/1997 | Diaz et al. |
| 5,576,755 A | 11/1996 | Davis et al. | | 5,689,666 A | 11/1997 | Berquist et al. |
| 5,576,951 A | 11/1996 | Lockwood | | 5,692,214 A | 11/1997 | Levine |
| 5,579,055 A | 11/1996 | Hamilton et al. | | 5,694,163 A | 12/1997 | Harrison |
| 5,579,239 A | 11/1996 | Freeman et al. | | 5,694,176 A | 12/1997 | Bruette et al. |
| 5,581,479 A | 12/1996 | McLaughlin et al. | | 5,694,381 A | 12/1997 | Sako |
| 5,582,364 A | 12/1996 | Trulin et al. | | 5,696,905 A | 12/1997 | Reimer et al. |
| 5,583,560 A | 12/1996 | Florin et al. | | 5,699,052 A | 12/1997 | Miyahara |
| 5,583,563 A | 12/1996 | Wanderscheid et al. | | 5,699,107 A | 12/1997 | Lawler et al. |
| 5,585,838 A * | 12/1996 | Lawler et al. ................ 725/54 | | 5,699,125 A | 12/1997 | Rzeszewski et al. |
| 5,585,865 A | 12/1996 | Amano et al. | | 5,708,478 A | 1/1998 | Tognazzini |
| 5,585,866 A | 12/1996 | Miller et al. | | 5,710,601 A | 1/1998 | Marshall et al. |
| 5,589,892 A | 12/1996 | Knee et al. | | 5,710,815 A | 1/1998 | Ming et al. |
| 5,592,551 A | 1/1997 | Lett et al. | | 5,710,884 A | 1/1998 | Dedrick |
| 5,594,490 A | 1/1997 | Dawson et al. | | 5,715,314 A | 2/1998 | Payne et al. |
| 5,594,509 A | 1/1997 | Florin et al. | | 5,715,399 A | 2/1998 | Bezos |
| 5,594,661 A | 1/1997 | Bruner et al. | | 5,717,452 A | 2/1998 | Janin et al. |
| 5,596,373 A | 1/1997 | White et al. | | 5,717,923 A | 2/1998 | Dedrick |
| 5,600,364 A | 2/1997 | Hendricks et al. | | 5,721,829 A | 2/1998 | Dunn et al. |
| 5,600,366 A | 2/1997 | Schulman | | 5,722,041 A | 2/1998 | Freadman |
| 5,600,573 A | 2/1997 | Hendricks et al. | | 5,724,103 A | 3/1998 | Batchelor |
| 5,602,582 A | 2/1997 | Wanderscheid et al. | | 5,724,521 A | 3/1998 | Dedrick |
| 5,602,596 A | 2/1997 | Claussen et al. | | 5,724,525 A | 3/1998 | Beyers, II et al. |
| 5,602,597 A | 2/1997 | Bertram | | 5,724,567 A | 3/1998 | Rose et al. |
| 5,602,598 A | 2/1997 | Shintani | | 5,727,060 A | 3/1998 | Young |
| 5,604,544 A | 2/1997 | Bertram | | 5,727,163 A | 3/1998 | Bezos |
| 5,606,374 A | 2/1997 | Bertram | | 5,731,844 A | 3/1998 | Rauch et al. |
| 5,610,653 A | 3/1997 | Abecassis | | 5,734,444 A | 3/1998 | Yoshinobu |
| 5,617,526 A | 4/1997 | Oran et al. | | 5,734,853 A | 3/1998 | Hendricks et al. |
| 5,617,565 A | 4/1997 | Augenbraun et al. | | 5,734,893 A | 3/1998 | Li et al. |
| 5,619,247 A | 4/1997 | Russo | | 5,737,028 A | 4/1998 | Bertram et al. |
| 5,619,249 A | 4/1997 | Billock et al. | | 5,737,029 A | 4/1998 | Ohkura et al. |
| 5,619,274 A | 4/1997 | Roop et al. | | 5,737,030 A | 4/1998 | Hong et al. |
| 5,621,456 A | 4/1997 | Florin et al. | | 5,740,549 A | 4/1998 | Reilly et al. |
| 5,623,316 A | 4/1997 | Naito et al. | | 5,748,191 A | 5/1998 | Rozak et al. |
| 5,623,613 A | 4/1997 | Rowe et al. | | 5,751,282 A | 5/1998 | Girard et al. |
| 5,627,940 A | 5/1997 | Rohra et al. | | 5,752,159 A | 5/1998 | Faust et al. |
| 5,629,733 A | 5/1997 | Youman et al. | | 5,752,160 A | 5/1998 | Dunn |
| 5,630,119 A | 5/1997 | Aristides et al. | | 5,754,258 A | 5/1998 | Hanaya et al. |
| 5,631,995 A | 5/1997 | Weissensteiner et al. | | 5,754,771 A | 5/1998 | Epperson et al. |
| 5,633,683 A | 5/1997 | Rosengren et al. | | 5,754,939 A | 5/1998 | Herz et al. |
| 5,635,978 A | 6/1997 | Alten et al. | | 5,757,417 A | 5/1998 | Aras et al. |
| 5,635,979 A | 6/1997 | Kostreski et al. | | 5,758,257 A | 5/1998 | Herz et al. |
| 5,635,989 A | 6/1997 | Rothmuller | | 5,758,259 A | 5/1998 | Lawler |
| 5,636,346 A | 6/1997 | Saxe | | 5,760,821 A | 6/1998 | Ellis et al. |
| 5,640,484 A | 6/1997 | Mankovitz | | 5,761,372 A | 6/1998 | Yoshinobu et al. |
| 5,640,501 A | 6/1997 | Turpin | | 5,761,601 A | 6/1998 | Nemirofsky et al. |
| 5,640,577 A | 6/1997 | Scharmer | | 5,761,606 A | 6/1998 | Wolzien |
| 5,642,153 A | 6/1997 | Chaney et al. | | 5,768,528 A | 6/1998 | Stumm |
| 5,648,813 A | 7/1997 | Tanigawa et al. | | 5,774,170 A | 6/1998 | Hite et al. |
| 5,648,824 A | 7/1997 | Dunn et al. | | 5,774,357 A | 6/1998 | Hoffberg et al. |
| 5,650,826 A | 7/1997 | Eitz | | 5,774,534 A | 6/1998 | Mayer |
| 5,650,831 A | 7/1997 | Farwell | | 5,774,664 A | 6/1998 | Hidary et al. |
| 5,652,613 A | 7/1997 | Lazarus et al. | | 5,774,887 A | 6/1998 | Wolff et al. |

| | | | | | |
|---|---|---|---|---|---|
| 5,778,181 A | 7/1998 | Hidary et al. | 5,886,691 A | 3/1999 | Furuya et al. |
| 5,778,182 A | 7/1998 | Cathey et al. | 5,886,731 A | 3/1999 | Ebisawa |
| 5,781,226 A | 7/1998 | Sheehan | 5,886,732 A | 3/1999 | Humpleman |
| 5,781,245 A | 7/1998 | Van Der Weij et al. | 5,889,950 A | 3/1999 | Kuzma |
| 5,781,246 A | 7/1998 | Alten et al. | 5,892,498 A | 4/1999 | Marshall et al. |
| 5,781,734 A | 7/1998 | Ohno et al. | 5,892,535 A | 4/1999 | Allen et al. |
| 5,784,258 A | 7/1998 | Quinn | 5,892,767 A | 4/1999 | Bell et al. |
| 5,787,259 A | 7/1998 | Haroun et al. | 5,900,905 A | 5/1999 | Shoff et al. |
| 5,788,507 A | 8/1998 | Redford et al. | 5,903,314 A | 5/1999 | Niijima et al. |
| 5,790,201 A | 8/1998 | Antos | 5,903,545 A | 5/1999 | Sabourin et al. |
| 5,790,202 A | 8/1998 | Kummer et al. | 5,903,816 A | 5/1999 | Broadwin et al. |
| 5,790,426 A | 8/1998 | Robinson | 5,905,497 A | 5/1999 | Vaughan et al. |
| 5,790,753 A | 8/1998 | Krishnamoorthy et al. | 5,907,322 A | 5/1999 | Kelly et al. |
| 5,793,438 A | 8/1998 | Bedard | 5,907,323 A | 5/1999 | Lawler et al. |
| 5,793,964 A | 8/1998 | Rogers et al. | 5,907,366 A | 5/1999 | Farmer et al. |
| 5,793,972 A | 8/1998 | Shane et al. | 5,912,664 A | 6/1999 | Eick et al. |
| 5,798,785 A | 8/1998 | Hendricks et al. | 5,914,712 A | 6/1999 | Sartain et al. |
| 5,801,747 A | 9/1998 | Bedard | 5,914,746 A | 6/1999 | Matthews, III et al. |
| 5,801,785 A | 9/1998 | Crump et al. | 5,917,481 A | 6/1999 | Rzeszewski et al. |
| 5,801,787 A | 9/1998 | Schein et al. | 5,917,830 A | 6/1999 | Chen et al. |
| 5,802,284 A | 9/1998 | Karlton et al. | 5,918,014 A | 6/1999 | Robinson |
| 5,805,154 A | 9/1998 | Brown | 5,920,700 A | 7/1999 | Gordon et al. |
| 5,805,167 A | 9/1998 | van Cruyningen | 5,923,848 A | 7/1999 | Goodhand et al. |
| 5,805,235 A | 9/1998 | Bedard | 5,929,849 A | 7/1999 | Kikinis |
| 5,805,763 A | 9/1998 | Lawler et al. | 5,929,850 A | 7/1999 | Broadwin et al. |
| 5,805,804 A | 9/1998 | Laursen et al. | 5,929,932 A | 7/1999 | Otsuki et al. |
| 5,805,806 A | 9/1998 | McArthur | 5,931,905 A | 8/1999 | HaSshimoto et al. |
| 5,808,608 A | 9/1998 | Young et al. | 5,936,679 A | 8/1999 | Kasahara et al. |
| 5,808,694 A | 9/1998 | Usui et al. | 5,937,160 A | 8/1999 | Davis et al. |
| 5,809,204 A | 9/1998 | Young et al. | 5,940,073 A | 8/1999 | Klosterman et al. |
| 5,809,214 A | 9/1998 | Nureki et al. | 5,940,572 A | 8/1999 | Balaban et al. |
| 5,812,124 A | 9/1998 | Eick et al. | 5,945,988 A | 8/1999 | Williams et al. |
| 5,812,205 A | 9/1998 | Milnes et al. | 5,946,386 A | 8/1999 | Rogers et al. |
| 5,812,931 A | 9/1998 | Yuen | 5,946,678 A | 8/1999 | Aalbersberg |
| 5,815,145 A | 9/1998 | Matthews, III | 5,951,642 A | 9/1999 | Onoe et al. |
| 5,815,671 A | 9/1998 | Morrison | 5,955,988 A | 9/1999 | Blonstein et al. |
| 5,818,438 A | 10/1998 | Howe et al. | 5,959,688 A | 9/1999 | Schein et al. |
| 5,818,439 A | 10/1998 | Nagasaka et al. | 5,960,411 A | 9/1999 | Hartman et al. |
| 5,818,441 A | 10/1998 | Throckmorton et al. | 5,973,683 A | 10/1999 | Cragun et al. |
| 5,818,541 A | 10/1998 | Matsuura et al. | 5,974,222 A | 10/1999 | Yuen et al. |
| 5,818,935 A | 10/1998 | Maa | 5,977,964 A | 11/1999 | Williams et al. |
| 5,819,019 A | 10/1998 | Nelson | 5,986,650 A | 11/1999 | Ellis et al. |
| 5,819,156 A | 10/1998 | Belmont | 5,988,078 A | 11/1999 | Levine |
| 5,819,284 A | 10/1998 | Farber et al. | 5,990,890 A | 11/1999 | Etheredge |
| 5,822,123 A | 10/1998 | Davis et al. | 5,990,927 A | 11/1999 | Hendricks et al. |
| 5,825,407 A | 10/1998 | Cowe et al. | 5,991,799 A | 11/1999 | Yen et al. |
| 5,828,402 A | 10/1998 | Collings | 5,999,912 A | 12/1999 | Wodarz et al. |
| 5,828,419 A | 10/1998 | Bruette et al. | 6,002,393 A | 12/1999 | Hite et al. |
| 5,828,420 A | 10/1998 | Marshall et al. | 6,002,394 A | 12/1999 | Schein et al. |
| 5,828,839 A | 10/1998 | Moncreiff | 6,005,562 A | 12/1999 | Shiga et al. |
| 5,828,945 A | 10/1998 | Klosterman | 6,005,563 A | 12/1999 | White et al. |
| 5,830,068 A | 11/1998 | Brenner et al. | 6,005,565 A | 12/1999 | Legall et al. |
| 5,832,223 A | 11/1998 | Hara et al. | 6,005,597 A | 12/1999 | Barrett et al. |
| 5,833,468 A | 11/1998 | Guy et al. | 6,006,257 A | 12/1999 | Slezak |
| 5,835,717 A | 11/1998 | Karlton et al. | 6,008,802 A | 12/1999 | Iki et al. |
| 5,838,314 A | 11/1998 | Neel et al. | 6,008,803 A | 12/1999 | Rowe et al. |
| 5,838,383 A | 11/1998 | Chimoto et al. | 6,011,546 A | 1/2000 | Bertram |
| 5,842,010 A | 11/1998 | Jain et al. | 6,012,086 A | 1/2000 | Lowell |
| 5,842,199 A | 11/1998 | Miller et al. | 6,014,137 A | 1/2000 | Burns |
| 5,844,552 A | 12/1998 | Gaughan et al. | 6,014,184 A | 1/2000 | Knee et al. |
| 5,844,620 A | 12/1998 | Coleman et al. | 6,014,502 A | 1/2000 | Moraes |
| 5,848,352 A | 12/1998 | Dougherty et al. | 6,016,141 A | 1/2000 | Knudson et al. |
| 5,848,396 A | 12/1998 | Gerace | 6,018,372 A | 1/2000 | Etheredge |
| 5,848,397 A | 12/1998 | Marsh et al. | 6,018,768 A | 1/2000 | Ullman et al. |
| 5,850,218 A | 12/1998 | LaJoie et al. | 6,020,883 A | 2/2000 | Herz et al. |
| 5,852,437 A | 12/1998 | Wugofski et al. | 6,020,929 A | 2/2000 | Marshall et al. |
| 5,861,881 A | 1/1999 | Freeman et al. | 6,023,267 A | 2/2000 | Chapuis et al. |
| 5,861,906 A | 1/1999 | Dunn et al. | 6,025,837 A | 2/2000 | Matthews, III et al. |
| 5,862,292 A | 1/1999 | Kubota et al. | 6,025,886 A | 2/2000 | Koda |
| 5,867,226 A | 2/1999 | Wehmeyer | 6,028,599 A | 2/2000 | Yuen et al. |
| 5,867,227 A | 2/1999 | Yamaguchi | 6,029,045 A | 2/2000 | Picco et al. |
| 5,867,233 A | 2/1999 | Tanaka et al. | 6,029,195 A | 2/2000 | Herz |
| 5,872,588 A | 2/1999 | Aras et al. | 6,035,304 A | 3/2000 | Machida et al. |
| 5,873,660 A | 2/1999 | Walsh et al. | 6,047,317 A | 4/2000 | Bisdikian et al. |
| 5,874,985 A | 2/1999 | Matthews, III | 6,049,824 A | 4/2000 | Simonin |
| 5,875,108 A | 2/1999 | Hoffberg et al. | 6,052,145 A | 4/2000 | Macrae et al. |
| 5,877,906 A | 3/1999 | Nagasawa et al. | 6,058,238 A | 5/2000 | Ng |
| 5,880,768 A | 3/1999 | Lemmons et al. | 6,061,060 A | 5/2000 | Berry et al. |
| 5,883,677 A | 3/1999 | Hofmann | 6,061,097 A | 5/2000 | Satterfield |

| | | |
|---|---|---|
| 6,064,376 A | 5/2000 | Berezowski et al. |
| 6,064,980 A | 5/2000 | Jacobi et al. |
| 6,067,303 A | 5/2000 | Aaker et al. |
| 6,067,561 A | 5/2000 | Dillon |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,124,854 A | 9/2000 | Sartain et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,141,003 A | 10/2000 | Chor et al. |
| 6,147,714 A | 11/2000 | Terasawa et al. |
| 6,151,059 A | 11/2000 | Schein et al. |
| 6,151,643 A | 11/2000 | Cheng et al. |
| 6,154,203 A | 11/2000 | Yuen et al. |
| 6,157,411 A | 12/2000 | Williams et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,163,345 A | 12/2000 | Noguchi et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,184,877 B1 | 2/2001 | Dodson et al. |
| 6,186,443 B1 | 2/2001 | Shaffer |
| 6,191,780 B1 | 2/2001 | Martin et al. |
| 6,202,212 B1 | 3/2001 | Sturgeon et al. |
| 6,208,384 B1 | 3/2001 | Schultheiss |
| 6,209,129 B1 | 3/2001 | Carr et al. |
| 6,209,130 B1 | 3/2001 | Rector, Jr. et al. |
| 6,212,553 B1 | 4/2001 | Lee et al. |
| 6,216,264 B1 | 4/2001 | Maze et al. |
| 6,239,794 B1 | 5/2001 | Yuen et al. |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,310,886 B1 | 10/2001 | Barton |
| 6,311,877 B1 | 11/2001 | Yang |
| 6,312,336 B1 | 11/2001 | Handelman et al. |
| 6,317,885 B1 | 11/2001 | Fries |
| 6,320,588 B1 | 11/2001 | Palmer et al. |
| 6,323,911 B1 | 11/2001 | Schein et al. |
| 6,327,049 B1 | 12/2001 | Ohtsuka |
| 6,331,877 B1 | 12/2001 | Bennington et al. |
| 6,331,887 B1 | 12/2001 | Shiraishi et al. |
| 6,335,963 B1 | 1/2002 | Bosco |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |
| 6,359,636 B1 | 3/2002 | Schindler et al. |
| 6,363,525 B1 | 3/2002 | Dougherty et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,411,696 B1 | 6/2002 | Iverson et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,426,779 B1 | 7/2002 | Noguchi et al. |
| 6,437,836 B1 | 8/2002 | Huang et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,498,895 B2 | 12/2002 | Young et al. |
| 6,499,138 B1 | 12/2002 | Swix et al. |
| 6,505,348 B1 | 1/2003 | Knowles et al. |
| 6,509,908 B1 | 1/2003 | Croy et al. |
| 6,515,680 B1 | 2/2003 | Hendricks et al. |
| 6,516,467 B1 | 2/2003 | Schindler et al. |
| 6,539,548 B1 | 3/2003 | Hendricks et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,567,982 B1 | 5/2003 | Howe et al. |
| 6,571,390 B1 * | 5/2003 | Dunn et al. ............ 725/52 |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,611,654 B1 | 8/2003 | Shteyn |
| 6,622,306 B1 | 9/2003 | Kamada |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,675,385 B1 | 1/2004 | Wang |
| 6,675,386 B1 | 1/2004 | Hendricks et al. |
| 6,687,906 B1 | 2/2004 | Yuen et al. |
| 6,698,020 B1 | 2/2004 | Zigmond et al. |
| 6,732,369 B1 | 5/2004 | Schein et al. |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,754,904 B1 | 6/2004 | Cooper et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,799,326 B2 | 9/2004 | Boylan, III et al. |
| 6,799,327 B1 | 9/2004 | Reynolds et al. |
| 6,828,993 B1 | 12/2004 | Hendricks et al. |
| 6,865,746 B1 | 3/2005 | Herrington et al. |
| 6,868,551 B1 | 3/2005 | Lawler et al. |
| 6,898,762 B2 | 5/2005 | Ellis et al. |
| 6,925,567 B1 | 8/2005 | Hirata et al. |
| 6,938,208 B2 | 8/2005 | Reichardt |
| 6,973,669 B2 | 12/2005 | Daniels |

| | | | | | | |
|---|---|---|---|---|---|---|
| 6,983,478 B1 | 1/2006 | Grauch et al. | CA | 2151458 | | 6/1994 |
| 7,003,792 B1 | 2/2006 | Yuen | CA | 2164608 | | 12/1994 |
| 7,028,326 B1 | 4/2006 | Westlake et al. | CA | 2312326 | | 6/1999 |
| 7,039,935 B2 | 5/2006 | Knudson et al. | CN | 1 200 221 | | 11/1998 |
| 7,058,635 B1 | 6/2006 | Shah-Nazaroff et al. | CN | 1 567 986 | | 1/2005 |
| 7,062,777 B2 | 6/2006 | Alba et al. | DE | 29 18 846 | | 11/1980 |
| 7,069,576 B1 | 6/2006 | Knudson et al. | DE | 2918846 | | 11/1980 |
| 7,165,098 B1 | 1/2007 | Boyer et al. | DE | 31 51 492 | | 7/1983 |
| 7,185,355 B1 | 2/2007 | Ellis et al. | DE | 32 46 225 | | 6/1984 |
| 7,187,847 B2 | 3/2007 | Young et al. | DE | 3246225 | | 6/1984 |
| 7,266,833 B2 | 9/2007 | Ward, III et al. | DE | 33 37 204 | | 4/1985 |
| 7,287,267 B2 | 10/2007 | Knudson et al. | DE | 3337204 | | 4/1985 |
| 7,293,276 B2 | 11/2007 | Phillips et al. | DE | 36 21 263 | | 1/1988 |
| 7,328,450 B2 | 2/2008 | Macrae et al. | DE | 3621263 | | 1/1988 |
| 7,392,532 B2 | 6/2008 | White et al. | DE | 36 40 436 | | 6/1988 |
| 7,437,751 B2 | 10/2008 | Daniels | DE | 39 09 334 | | 9/1990 |
| 7,480,929 B2 | 1/2009 | Klosterman et al. | DE | 3909334 | | 9/1990 |
| 7,493,641 B2 | 2/2009 | Klosterman et al. | DE | 42 01 031 | | 7/1993 |
| 7,503,055 B2 | 3/2009 | Reynolds et al. | DE | 42 17 246 | | 12/1993 |
| 2001/0001160 A1 | 5/2001 | Shoff et al. | DE | 42 40 187 | | 6/1994 |
| 2001/0029610 A1 | 10/2001 | Corvin et al. | DE | 44 07 701 | | 9/1995 |
| 2001/0042246 A1 | 11/2001 | Yuen et al. | DE | 44 40 419 | | 5/1996 |
| 2001/0047298 A1 | 11/2001 | Moore et al. | DE | 195 31 121 | | 2/1997 |
| 2001/0049820 A1 | 12/2001 | Barton | DE | 19531121 | | 2/1997 |
| 2001/0054181 A1 | 12/2001 | Corvin | DE | 197 40 079 | | 3/1999 |
| 2002/0010926 A1 | 1/2002 | Lee | DE | 19740079 | | 3/1999 |
| 2002/0026496 A1 | 2/2002 | Boyer et al. | DE | 199 31 046 | | 1/2001 |
| 2002/0032907 A1 | 3/2002 | Daniels | DE | 19931046 | | 1/2001 |
| 2002/0042913 A1 | 4/2002 | Ellis et al. | EP | 0 239 884 | | 10/1987 |
| 2002/0042914 A1 | 4/2002 | Walker et al. | EP | 0 276 425 | | 8/1988 |
| 2002/0042918 A1 | 4/2002 | Townsend et al. | EP | 0 396 062 | | 11/1990 |
| 2002/0059602 A1 | 5/2002 | Macrae et al. | EP | 0 401 930 | | 12/1990 |
| 2002/0073424 A1 | 6/2002 | Ward, III et al. | EP | 0 408 892 | | 1/1991 |
| 2002/0083439 A1 | 6/2002 | Eldering | EP | 0 420 123 | | 4/1991 |
| 2002/0092017 A1 | 7/2002 | Klosterman et al. | EP | 0 424 648 | | 5/1991 |
| 2002/0112249 A1 | 8/2002 | Hendricks et al. | EP | 0 444 496 | | 9/1991 |
| 2002/0124249 A1 | 9/2002 | Shintani et al. | EP | 0 447 968 | | 9/1991 |
| 2003/0005432 A1 | 1/2003 | Ellis et al. | EP | 0 532 322 | | 3/1993 |
| 2003/0005445 A1 | 1/2003 | Schein et al. | EP | 0 550 911 | | 7/1993 |
| 2003/0031465 A1 | 2/2003 | Blake | EP | 0 560 593 | | 9/1993 |
| 2003/0110499 A1 | 6/2003 | Knudson et al. | EP | 0 572 090 | | 12/1993 |
| 2003/0164858 A1 | 9/2003 | Klosterman et al. | EP | 0 617 563 | | 9/1994 |
| 2003/0188311 A1 | 10/2003 | Yuen et al. | EP | 0 624 040 | | 11/1994 |
| 2003/0196201 A1 | 10/2003 | Schein et al. | EP | 0 682 452 | | 11/1995 |
| 2003/0196203 A1 | 10/2003 | Ellis et al. | EP | 0682452 | | 11/1995 |
| 2003/0204847 A1 | 10/2003 | Ellis et al. | EP | 0 705 036 | | 4/1996 |
| 2003/0208758 A1 | 11/2003 | Schein et al. | EP | 0 721 253 | | 7/1996 |
| 2004/0003407 A1 | 1/2004 | Hanafee et al. | EP | 0 723 369 | | 7/1996 |
| 2004/0049787 A1 | 3/2004 | Maissel et al. | EP | 0 725 539 | | 8/1996 |
| 2004/0078809 A1 | 4/2004 | Drazin | EP | 0 742 669 | | 11/1996 |
| 2004/0111742 A1 | 6/2004 | Hendricks et al. | EP | 0 752 767 | | 1/1997 |
| 2004/0139465 A1 | 7/2004 | Matthews, III et al. | EP | 0 753 964 | | 1/1997 |
| 2004/0194131 A1 | 9/2004 | Ellis et al. | EP | 0 762 751 | | 3/1997 |
| 2004/0194138 A1 | 9/2004 | Boylan, III et al. | EP | 0 772 360 | | 5/1997 |
| 2005/0015815 A1 | 1/2005 | Shoff et al. | EP | 0 774 866 | | 5/1997 |
| 2005/0097622 A1 | 5/2005 | Zigmond et al. | EP | 0 774 866 | A2 | 5/1997 |
| 2005/0155056 A1 | 7/2005 | Knee et al. | EP | 0 775 417 | | 5/1997 |
| 2005/0157217 A1 | 7/2005 | Hendricks | EP | 0 784 405 | | 7/1997 |
| 2005/0198668 A1 | 9/2005 | Yuen et al. | EP | 0 793 225 | | 9/1997 |
| 2005/0204382 A1 | 9/2005 | Ellis | EP | 0 805 594 | | 11/1997 |
| 2005/0204388 A1 | 9/2005 | Knudson et al. | EP | 0 822 718 | | 2/1998 |
| 2005/0235320 A1 | 10/2005 | Maze et al. | EP | 0 827 340 | | 3/1998 |
| 2005/0244138 A1 | 11/2005 | O'Connor et al. | EP | 0 834 798 | | 4/1998 |
| 2005/0278741 A1 | 12/2005 | Robarts et al. | EP | 0 837 599 | | 4/1998 |
| 2005/0283796 A1 | 12/2005 | Flickinger | EP | 0 848 554 | | 6/1998 |
| 2006/0037044 A1 | 2/2006 | Daniels | EP | 0 849 948 | | 6/1998 |
| 2006/0248555 A1 | 11/2006 | Eldering | EP | 0 851 681 | | 7/1998 |
| 2006/0277574 A1 | 12/2006 | Schein et al. | EP | 0 852 442 | | 7/1998 |
| 2008/0178221 A1 | 7/2008 | Schein et al. | EP | 0 854 645 | | 7/1998 |
| 2008/0184303 A1 | 7/2008 | Schein et al. | EP | 0 854 645 | A2 | 7/1998 |
| 2008/0184315 A1 | 7/2008 | Ellis et al. | EP | 0 854 654 | | 7/1998 |
| 2008/0235725 A1 | 9/2008 | Hendricks | EP | 0 852 361 | | 8/1998 |
| | | | EP | 0 880 856 | | 12/1998 |
| FOREIGN PATENT DOCUMENTS | | | EP | 0 905 985 | | 3/1999 |
| CA | 1030505 | 5/1978 | EP | 0 924 927 | | 6/1999 |
| CA | 1187197 | 5/1985 | EP | 0 935 393 | | 8/1999 |
| CA | 1188811 | 6/1985 | EP | 0 944 253 | | 9/1999 |
| CA | 1196082 | 10/1985 | EP | 0 963 119 | | 12/1999 |
| CA | 1200911 | 2/1986 | EP | 0 988 876 | | 3/2000 |

| | | | | | |
|---|---|---|---|---|---|
| EP | 1 095 504 | 5/2001 | WO | WO 88/04057 | 6/1988 |
| FR | 2662895 | 12/1991 | WO | WO 88/04507 | 6/1988 |
| GB | 1 554 411 | 10/1979 | WO | WO 89/02682 | 3/1989 |
| GB | 2 034 995 | 6/1980 | WO | WO 89/03085 | 4/1989 |
| GB | 2034995 | 6/1980 | WO | WO 89/12370 | 12/1989 |
| GB | 2 126 002 | 3/1984 | WO | WO 90/01243 | 2/1990 |
| GB | 2126002 | 3/1984 | WO | WO 90/15507 | 12/1990 |
| GB | 2 185 670 | 7/1987 | WO | WO 91/00670 | 1/1991 |
| GB | 2185670 | 7/1987 | WO | WO 91/18476 | 11/1991 |
| GB | 2 256 546 | 12/1992 | WO | WO 92/04801 | 3/1992 |
| GB | 2256546 | 12/1992 | WO | WO 93/04473 | 3/1993 |
| GB | 2 265 792 | 10/1993 | WO | WO 93/05452 | 3/1993 |
| GB | 2 309 134 | 7/1997 | WO | WO 93/11638 | 6/1993 |
| GB | 2309134 | 7/1997 | WO | WO 93/11639 | 6/1993 |
| GB | 2 325 537 | 11/1998 | WO | WO 93/11640 | 6/1993 |
| JP | 58-137334 | 8/1983 | WO | WO 93/23957 | 11/1993 |
| JP | 58-196738 | 11/1983 | WO | WO 94/13107 | 6/1994 |
| JP | 58-210776 | 12/1983 | WO | WO 94/14281 | 6/1994 |
| JP | 59-141878 | 8/1984 | WO | WO 94/14282 | 6/1994 |
| JP | 60-61935 | 4/1985 | WO | WO 94/14283 | 6/1994 |
| JP | 61-050470 | 3/1986 | WO | WO 94/14284 | 6/1994 |
| JP | 61-074476 | 4/1986 | WO | WO 94/21085 | 9/1994 |
| JP | 62-060370 | 3/1987 | WO | WO 94/23383 | 10/1994 |
| JP | 62-060384 | 3/1987 | WO | WO 94/29811 | 12/1994 |
| JP | 63-092177 | 4/1988 | WO | WO 95/01056 | 1/1995 |
| JP | 63-234679 | 9/1988 | WO | WO 95/01058 | 1/1995 |
| JP | 10-042235 | 2/1989 | WO | WO 95/01059 | 1/1995 |
| JP | 10-093933 | 4/1989 | WO | WO 95/06389 | 3/1995 |
| JP | 01-307944 | 12/1989 | WO | WO 95/07003 | 3/1995 |
| JP | 1-307944 | 12/1989 | WO | WO 95/10910 | 4/1995 |
| JP | 2-048879 | 2/1990 | WO | WO 95/15649 | 6/1995 |
| JP | 02-048879 | 2/1990 | WO | WO 95/15657 | 6/1995 |
| JP | 03-022770 | 1/1991 | WO | WO 95/15658 | 6/1995 |
| JP | 03-063990 | 3/1991 | WO | WO 95/16568 | 6/1995 |
| JP | 03063990 | 3/1991 | WO | WO 95/19092 | 7/1995 |
| JP | 04-079053 | 3/1992 | WO | WO 95/26608 | 10/1995 |
| JP | 04-227380 | 8/1992 | WO | WO 95/28055 | 10/1995 |
| JP | 05-183826 | 7/1993 | WO | WO 95/28799 | 10/1995 |
| JP | 05-260400 | 10/1993 | WO | WO 95/30961 | 11/1995 |
| JP | 05-284437 | 10/1993 | WO | WO 95/31069 | 11/1995 |
| JP | 06-021907 | 1/1994 | WO | WO 95/32583 | 11/1995 |
| JP | 06-038165 | 2/1994 | WO | WO 95/32585 | 11/1995 |
| JP | 06-504165 | 5/1994 | WO | WO 96/07270 | 3/1996 |
| JP | 06-243539 | 9/1994 | WO | WO 96/08109 | 3/1996 |
| JP | 07-020254 | 1/1995 | WO | WO 96/08113 | 3/1996 |
| JP | 07-050259 | 2/1995 | WO | WO 96/09721 | 3/1996 |
| JP | 07-076592 | 3/1995 | WO | WO 96/13932 | 5/1996 |
| JP | 07-123326 | 5/1995 | WO | WO 96/13935 | 5/1996 |
| JP | 07-135621 | 5/1995 | WO | WO 96/17467 | 6/1996 |
| JP | 07-147657 | 6/1995 | WO | WO 96/17473 | 6/1996 |
| JP | 07-154349 | 6/1995 | WO | WO 96/21990 | 7/1996 |
| JP | 07-160732 | 6/1995 | WO | WO 96/26605 | 8/1996 |
| JP | 07-184131 | 7/1995 | WO | WO 96/27270 | 9/1996 |
| JP | 07-193762 | 7/1995 | WO | WO 96/27982 | 9/1996 |
| JP | 07-193763 | 7/1995 | WO | WO 96/31980 | 10/1996 |
| JP | 07-288759 | 10/1995 | WO | WO 96/34467 | 10/1996 |
| JP | 07-321748 | 12/1995 | WO | WO 96/34486 | 10/1996 |
| JP | 08-32528 | 2/1996 | WO | WO 96/34491 | 10/1996 |
| JP | 08-32538 | 2/1996 | WO | WO 96/38799 | 12/1996 |
| JP | 08-056352 | 2/1996 | WO | WO 96/41471 | 12/1996 |
| JP | 08-125497 | 5/1996 | WO | WO 96/41477 | 12/1996 |
| JP | 08-506941 | 7/1996 | WO | WO 96/41478 | 12/1996 |
| JP | 08-251122 | 9/1996 | WO | WO 97/02702 | 1/1997 |
| JP | 08-275077 | 10/1996 | WO | WO 97/04595 | 2/1997 |
| JP | 09-037151 | 2/1997 | WO | WO 97/07656 | 3/1997 |
| JP | 9-37168 | 2/1997 | WO | WO 97/13368 | 4/1997 |
| JP | 09-037172 | 2/1997 | WO | WO 97/17774 | 5/1997 |
| JP | 09-102827 | 4/1997 | WO | WO 97/18675 | 5/1997 |
| JP | 09-162821 | 6/1997 | WO | WO 97/26612 | 7/1997 |
| JP | 09-070020 | 11/1997 | WO | WO 97/31480 | 8/1997 |
| JP | 10-143340 | 5/1998 | WO | WO 97/41673 | 11/1997 |
| JP | 10-143349 | 5/1998 | WO | WO 97/42763 | 11/1997 |
| JP | 10-512420 | 11/1998 | WO | WO 97/48230 | 12/1997 |
| JP | 2838892 | 12/1998 | WO | WO 97/49237 | 12/1997 |
| JP | 2001-213595 | 8/2001 | WO | WO 97/49241 | 12/1997 |
| JP | 2002-279969 | 9/2002 | WO | WO 97/49242 | 12/1997 |
| WO | WO 86/01359 | 2/1986 | WO | WO 98/06219 | 2/1998 |
| WO | WO 86/01962 | 3/1986 | WO | WO 98/10589 | 3/1998 |
| WO | WO 87/03766 | 6/1987 | WO | WO 98/16062 | 4/1998 |

| | | |
|---|---|---|
| WO | WO 98/17064 | 4/1998 |
| WO | WO 98/20675 | 5/1998 |
| WO | WO 98/26569 | 6/1998 |
| WO | WO 98/26584 | 6/1998 |
| WO | WO 98/27723 | 6/1998 |
| WO | WO 98/28906 | 7/1998 |
| WO | WO 98/31148 | 7/1998 |
| WO | WO 98/41020 | 9/1998 |
| WO | WO 98/43183 | 10/1998 |
| WO | WO 98/47279 | 10/1998 |
| WO | WO 98/48566 | 10/1998 |
| WO | WO 98/56172 | 12/1998 |
| WO | WO 99/01984 | 1/1999 |
| WO | WO 99/04561 | 1/1999 |
| WO | WO 99/07142 | 2/1999 |
| WO | WO 99/14947 | 3/1999 |
| WO | WO 99/18722 | 4/1999 |
| WO | WO 99/29109 | 6/1999 |
| WO | WO 99/30491 | 6/1999 |
| WO | WO 99/31480 | 6/1999 |
| WO | WO 99/45700 | 9/1999 |
| WO | WO 99/45701 | 9/1999 |
| WO | WO 99/45702 | 9/1999 |
| WO | WO 99/52285 | 10/1999 |
| WO | WO 99/56466 | 11/1999 |
| WO | WO 99/56473 | 11/1999 |
| WO | WO 99/60783 | 11/1999 |
| WO | WO 99/60789 | 11/1999 |
| WO | WO 00/04706 | 1/2000 |
| WO | WO 00/04708 | 1/2000 |
| WO | WO 00/05889 | 2/2000 |
| WO | WO 00/11865 | 3/2000 |
| WO | WO 00/13415 | 3/2000 |
| WO | WO 00/16548 | 3/2000 |
| WO | WO 00/27122 | 5/2000 |
| WO | WO 00/28734 | 5/2000 |
| WO | WO 00/33160 | 6/2000 |
| WO | WO 00/33224 | 6/2000 |
| WO | WO 00/33560 | 6/2000 |
| WO | WO 00/33573 | 6/2000 |
| WO | WO 00/49801 | 8/2000 |
| WO | WO 00/79798 | 12/2000 |
| WO | WO 01/01677 | 1/2001 |
| WO | WO 01/06784 | 1/2001 |
| WO | WO 01/15438 | 3/2001 |
| WO | WO 01/35662 | 5/2001 |
| WO | WO 01/89213 | 11/2001 |
| WO | WO 02/31731 | 4/2002 |
| WO | WO 02/084992 | 10/2002 |

OTHER PUBLICATIONS

U.S. Appl. No. 09/332,244, filed Jun. 11, 1999, Ellis et al.
U.S. Appl. No. 09/356,268, filed Jul. 16, 1999, Rudnick et al.
"272OR Satellite Receiver User's Guide," General Instrument, 1991, pp. 58-61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
"Computer Network: Current Status and Outlook on Leading Science and Technology," Bureau of Science & Technology (Japan), vol. 1, Dec. 1986.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
"Dial M for Movie", Funkschau Nov. 1994 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
"'Duck Tales,'(1987)[TV Series 1987-1990]," Internet Movie Database (IMDB) [Retrieved on Apr. 7, 2007].
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http://www.atvetcom/library/spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).
"Getting Started" Installation Guide, "Using StarSight 1" Manual, and Remote Control "Quick Reference Guide.".
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
James Sorce, David Fay, Brian Raila and Robert Virzi, "Designing a Broadband Residential Entertainment Service: A Case Study," GTE Laboratories Incorporated, undated, pp. 141-148.
"Lists> What's on Tonite! TV Listings (fwd)," Internet article (on line), Jan. 28, 1995, XP 002378869 [Retrieved on Apr. 28, 2006].
"MSI Datacasting Systems," TV Communications Journal, Jan. 1973.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.com/news/openstreamer_press_final.htm, printed on Jun. 28, 1999, the document bears a copyright date of 1999.
"PCT—Notification of transmittal of International Preliminary Examination Report," International Application No. PCT/US97/07449, Feb. 12, 1999, pp. 1-10.
"Prevue Networks and OpenTV(R) Agree to Work Together on Deploying Interactive Program Guides Worldwide," from the internet at http://www.opentv.com/news/prevuefinal.htm printed on Jun. 28, 1999.
"Probe XL Brochure, Auto Tote Systems Inc.," (Newark, Delaware) (undated) 57 pgs.
"Rewind, reply and unwind with new high-tech TV devices," by Lawrence J. Magid, LA Times. This document was printed from the internet on Jun. 6, 1999 and bears a date of May 19, 1999.
"Technological Examination & Basic Investigative Research Report on Image Databases," Japan Mechanical Engineering Organization Int'l Society for the Advancement of Image Software, Japan, Mar. 1988.
"Technology: Turn on, tune in and print out—An experimental interactive television service is set to alter our viewing habits," Financial Times (London), Oct. 14, 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
"TV Listings Functional Spec.," Time Video Information Services, Inc., undated.
"Using StarSight 2," Instruction Manual, StarSight Telecast, Inc., StarSight CB 1500 Customer Letter, 1994.
"Windows 98 Feature Combines TV, Terminal and the Internet," New York Times, Aug. 18, 1998.
"Prodigy Launches Interactive TV Listing", Apr. 22, 1994 public Broadcasting Report.
"StarSight Interactive Television Program Guide III" Jim Leftwich and Steve Schein, Functional/ Interactional Architecture Specification Document, Orbit Interaction, Palo alto, California, Published before Apr. 19, 1995.

"StarSight Interactive Television Program Guide IV" Jim Leftwich and Steve Schein, Functional/ Interactional Architecture Specification Document, Orbit Interaction, Palo Alto, California, Published before Apr. 19, 1995.

"StarSight Interactive Television Program Guide" Jim Leftwich, Willy Lai & Steve Schein Published before Apr. 19, 1995.

"TV Guide Online Set for Fall", Entertainment Marketing Letter, Aug. 1994.

Advertisement for "TV Decisions," Cable Vision, Aug. 4, 1986.

Alexander, Michael "Visualizing cleared-off desktops," Computerworld, May 6, 1991, p. 20.

Antonoff, M., "Stay Tuned for Smart TV," Popular Science, Nov. 1990, pp. 62-65.

Bach, U. et al., "Multimedia TV Set, Part 1" Radio-Fernsehen Elektronik (RFE), Sep. 1996, pp. 28, 30, 31. (English language translation attached.).

Bach, U. et al., "Multimedia TV Set, Part 2 and Conclusion," Radio-Fernsehen Elektronik (RFE), Oct. 1996, pp. 38-40. (English language translation attached.).

Baer, R.H, "Innovative Add-On TV Products," IEEE Transactions on Consumer Electronics, vol. CE-25, Nov. 1979, pp. 765-771.

Bensch, U., "VPV Videotext Programs Videorecorder," IEEE Paper, Jun. 1988, pp. 788-792.

Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.

Brochure, "A New Approach to Addressability," CableData, undated.

Brochure, "Westar and Videotoken Network Present the CableComputer," Revised Aug. 15, 1985 (Plaintiff's 334).

Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).

Brochure, VTN "Videotoken Network, New Dimension Television," Dec. 1985 (Plaintiff's Exhibit 313).

Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.

Cable Computer User's Guide, Rev. 1, Dec. 1985 (Plaintiff's Exhibit 289).

CableData, Roseville Consumer Presentation, Mar. 1985.

Carne, E.B., "The Wired Household," IEEE Spectrum, vol. 16 No. 10, Oct. 1979, pp. 61-66.

Chan, Patrick P., "Learning Considerations in User Interface Design: The Room Model," Publication of the Software Portability Laboratory, University of Waterloo, Ontario, Canada, Jul. 1984.

Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.

Cox, J. et al, "Extended Services in a Digital Compression System," Proceedings from Eleven Technical Sessions: 42nd Annual Convention and Exposition of the National Cable Television Association, Jun. 1993, pp. 185-191.

Damouny, N. G., "Teletext Decoders—Keeping Up With the Latest Advances," IEEE Transactions on Consumer Electronics, vol. CE-30, No. 3, Aug. 1984, pp. 429-435.

Declaration Under 37 C.F.R. § 1.132 of Richard E. Glassberg, signed Oct. 20, 2006, filed Oct. 24, 2006, from U.S. Appl. No. 10/346,266.

DiRosa, S. "BIGSURF Netguide", Jul. 1995, vol. 3.1 (Sections 18,21, and 28—renumbered as pp. 1-27).

Edwardson, S.M., & Gee, A., "CEEFAX: A Proposed New Broadcasting Service," Journal of the SMPTE, Jan. 1974, vol. 83 No. 1, pp. 14-19.

Eitz, Gerhard, "Zukünftige Informations-und Datenangebote beim digitalen Femsehen—EPG Und 'Lesezeichen'," RTM Rundfunktechnische Mitteilungen, Jun. 1997, vol. 41, pp. 67-72.

European Search Report dated Nov. 19, 2002 from European Application No. 989446111.7.

European Telecommunication Standard, "Electronic Programme Guide (EPG); Protocol for a TV Guide using electronic data transmission," pp. 1-45, sections 1-11.12.7 and annex A-P, bearing a date of May 1997.

Hartwig, Rautenberg, Bollmann, "Broadcasting and Processing of Program Guides for Digital TV," SMPTE Journal, pp. 727-732, Oct. 1997.

Hedger, J., "Telesoftware: Home Computing Via Broadcast Teletext," IEEE Transactions on Consumer Electronics, vol. CE-25, No. 3, Jul. 1979, pp. 279-287.

Hiroshi Ishii et al, "Clearface: Translucent Multiuser Interface for TeamWorkStation," ECSCW, Sep. 1991, pp. 6-10.

Hiroshi Ishii et al, "Toward an Open Shared Workspace: Computer and Video Fusion Approach of Team Workstation," Communications of the ACM, Dec. 1991, vol. 34 No. 12, pp. 37-50.

Hirotada Ueda et al, "Impact: An Interactive Natural-Motion-Picture Dedicated Multi-Media Authoring System," Communications of the ACM, Mar. 1991, pp. 343-350.

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.

Installation Guide, "Getting Started 1" Manual, and Remote Control "Quick Reference Guide."

Instruction Manual, "Using StarSight 2," StarSight Telecast, Inc., StarSight CB 1500 Customer Letter, 1994.

Instructional Manual, "Sonic the Hedgehog," Sega of America, 1992.

James, A., "Oracle—Broadcasting the Written Word," Wireless World, Jul. 1973, vol. 79 No. 1453, pp. 314-316.

Judice, C.N., "Move Over Cable, Here Comes Video Via Voice Lines," Network World, Sep. 1986, p. 26.

Kai et al "Development of a Simulation System for Integrated Services Television," Report from Information Processing Society of Japan, Japan, Sep. 13, 1996, vol. 96, No. 90 pgs.

Karstad, K., "Microprocessor Control for Color-TV Receivers," IEEE Transactions on Consumer Electronics, vol. CE-26, May 1980, pp. 149-155.

Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.

Listing of computer code for operating system within the Cable Computer in 1985 (Plaintiff's Exhibit 298).

Listing of computer code for Video HTU Program (Plaintiff's Exhibit 299).

Lowenstein, R.L. and Aller, H.E., "The Inevitable March of Videotex," Technology Review, vol. 88, Oct. 1985, p. 22.

M/A-COM, Inc., "Videocipher II Satellite Descrambler Owner's Manual," dated Prior Feb. 1986, pp. 1-17.

Mack Daily, "Addressable Decoder with Downloadable Operation," Proceedings from the Eleven Technical Sessions, 42nd Annual Convention and Exposition of the NCTA, Jun. 6-9, 1993, pp. 82-89.

Mannes, G., "Smart Screens: Development of Personal Navigation Systems for TV Viewers," Video Magazine, Dec. 1993.

Mar. 19, 1985 letter from G. Knapp of CableData to R. Hansen of Weststar Communications, Inc. (Plaintiff's Exhibit 325).

Markowitz, A. "Companies Jump on Interactive Bandwagon," Discount Store News, Dec. 6, 1993, pp. 4 and 131.

McKenzie, G.A., "Oracle—An Information Broadcasting Service Using Data Transmission in the Vertical Interval," Journal of the SMPTE, Jan. 1974, vol. 83 No. 1, pp. 6-10.

Merrell, R.G., "Tac Timer," 1986 NCTA Technical Papers, pp. 203-206.

Neumann, Andreas, "WDR Online Aufbau and Perspektiven Automatisierter Online-Dienste im WDR," RTM Rundfunktechnische Mitteilungen, vol. 41, pp. 56-66, Jun. 1997.

No subject, "Tom Schauer (tschauer@moscow.com)Thu, Sep. 28, 1995 16:46:48-700," XP-002378870 [Retrieved from the Internet Apr. 28, 2006].

Office Actions and Replies from U.S. Appl. No. 10/453,388.

Pfister, Larry T., "Teletext: Its Time Has Come," Prepared for the IGC Videotext / Teletext Conference, Andover, Massachusetts, Dec. 14, 1982, pp. 1-11.

Prevue Guide Brochure, Spring 1984.
Prevue Guide Brochure, Spring 1994.
Rayers, D.J., "Telesoftware by Teletext," 1984 IEEE Conference Papers, vol. 240, p. 323.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland Dec. 15, 1994, 1 pg.
Schlender, B.R., "Couch Potatoes! Now It's Smart TV," Fortune, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic, Dec. 1984.
Sunada, K. et al, "Teletext Color Television Receiver Model C-29M950, C26M940," NEC Home Electronics, NEC Giho, 1987.
Supplementary European Search Report for Application No. EP 98 93 5889, completed on Sep. 28, 2001.
Sussman, A. "GTE Tunes in to Home TV Shopping," PC Week, Jun. 28, 1988, p. C15.
Tech Notes: Product Updates from M/A-COM Cable Home Group, "Videocipher Owner's Manual Update," Issue No. 6, Feb. 1986.
Technical White Paper, "Open TV™ Operating Environment," ( © 1998 OpenTV Inc.), pp. 1-12.
Transcript of the Deposition of John Roop, Oct. 1996, pp. 186-187.
Trial testimony of Michael Axford, *Prevue Interactive, Inc.* and *United Video Satellite Group, Inc.* v. *StarSight Telecast, Inc.*, May 9, 1998, pp. 186-187, 295-315, and 352-357.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "VideoGuide User's Manual," pp. 1-27 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
"Advertisement for TV Decisions," Cable Vision, Aug. 4, 1986.
"Enhanced Content Specification," "ATVEF," from the internet at http://www.atvef.com/library/spec.html, printed Aug. 22, 2001, the document bears a Copyright date of 1998, 1999, 2000.
"Prevue Networks and OpenTV(R) Agree to Work Together on Deploying Interactive Program Guides Worldwide," from the internet at http://www.opentv.com/news/prevuefinal.htm, printed on Jun. 28, 1999.
Came, E.B., "The Wired Household," IEEE Spectrum, vol. 16 No. 10, Oct. 1979, pp. 61-66.
Chang et al., "An Open-Systems Approach to Video on Demand," IEEE Communications Magazine, May 1994, pp. 68-80.
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
DiRosa, S. "BIGBSURF Netguide", Jul. 1995, vol. 3.1 (Sections 18,21, and 28—renumbered as pp. 1-27).
Hoarty, W. Leo, "Multimedia on Cable Television Systems," Symposium Record Table TV Sessions, 18th International Television Symposium and Technical Exhibition, Montreux, Switzerland, Jun. 10, 1993, pp. 555-567.

Magid, Lawrence J., "Rewind, reply and unwind with new high-tech TV devices", LA Times. This document was printed from the internet on Jun. 7, 1999 and bears a date of May 19, 1999.
McKenzie, G.A., "Oracle —An Information Broadcasting Service Using Data Transmission in the Vertical Interval," Journal of the SMPTE, Jan. 1974, vol. 83 No. 1, pp. 6-10.
Neumann, Andreas, "WDR Online Aufbau und Perspektiven Automatisierter Online-Dienste im WDR," RTM Rundfunktechnische Mitteilungen, vol. 41, pp. 56-66, Jun. 1997.
Peddicord, Ross, "New on TV: You Bet Your Horse," The Sun, Baltimore Maryland Dec. 15, 1994, 1 pg.
Schauer, Tom, Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Sorce, et al, "Designing a Broadband Residential Entertainment Service: A Case Study," GTE Laboratories Incorporated, undated, pp. 141-148.
"Dialing the printed pages," IT in Europe Profile, 11/Spring 1977.
"Three men on a Viewdata bike", The Economist, Mar. 25, 1978.
"TV Guide Going Online," Telemedia, Broadcasting & Cable, Jun. 1994.
A Financial Times Survey: Viewdata (Advertisement), Financial Times, Mar. 20, 1979.
ACM Multimedia 93 Proceedings, "A Digital On-Demand Video Service Suporting Content-Based Queries," Little et al. pp. 427-436, Jul. 1993.
Armstrong, Larry, "Channel-Surfing's next wave: Henry Yuen's interactive TV guide takes on TCI and Viacom," BusinessWeek, Jul. 31, 1995.
Arnold, William F., "Britain to get wired city—via telephone," Electronics, Mar. 4, 1976, at 76.
Blahut et al., "Interactive Television," Proceedings of the IEEE, Jul. 1995.
Office Actions and Replies filed in U.S. Appl. No. 10/827,863, filed Apr. 19, 2004 (now Patent No. 8,205,232).
Office Actions and Replies filed in U.S. Appl. No. 11/894,604, filed Aug. 20, 2007 (now Patent No. 8,112,776).
Day, Rebecca, "The Great PC/TV Debate," OEM Magazine, Jul. 1, 1996.
DirecTV Plus2 System, Thompson Consumer Electronics, Inc. (1999).
Electronic Program Guide via Internet, Research Disclosure, Kenneth Mason Publications, Hampshire, GB Nr. 385 (May 1996) p. 276, ISSN:0374-4353.
Fernsehen—EPG Und "Lesezeichen", Rundfunktechnische Mitteilungen, vol. 41, pp. 67-72, Jun. 1997.
Growing US interest in the impact of viewdata, Computing Weekly, Jul. 20, 1978.
Hobbes Internet Timeline, Mar. 22, 2007.
Holland, Gary L. "NAPLPS standard defines graphics and text communications," EDN, Jan. 10, 1985, at 179.
Honey, is there anything good on the remote tonight?, advertisement from Multichannel News, Broadband Week Section, p. 168, Nov. 30, 1998.
How Evolve Works, from the Internet at http://www.evolveproducts.com/network.html, printed on Dec. 28, 1998.
Keith Lynch's timeline of net related terms and concepts,Mar. 22, 2007.
Large, "Throw away the books—Viewdata's coming," Guardian, Jan. 10, 1978.
Large, "Viewdata, the invention that brings boundless advice and information to the home, also sets a test for the Post Office," Financial Guardian, Jun. 29, 1978.
Iitusuka, Honbashi, Kuwana, Building Internet TV Guide Service 1 and 2, the 53rd National Conference Proceedings, Japan, Information Processing Society of Japan, Sep. 6, 1996 p. 3-227 to 230.
Iizuka, Motohashi, Kuwana. "Intanetto TV Gaido Sabisu no Kouchiku, sono 1, sono 2 [The ? Overview of Internet TV Guide Japan (1) and (2)]", Dai 53-kai (Heisei 8-nen Kouki) Zenkoku Taikai Kouen Ronbunshuu (3) [Proceedings of the 53rd (latter term of 1996) Annual Convention (3)], Sep. 6, 1996, p. 3-227 to 230. Only Translation Submitted. (English Translation).

Lloyd, "Impact of technology," Financial Times, Jul. 1978.James, A., "Oracle—Broadcasting the Written Word," Wireless World, Jul. 1973, vol. 79 No. 1453, pp. 314-316.

Miller, Matthew D., "A Scenario for the Deployment of Interactive Multimedia Cable Television Systems in the United States in the 1990s," IEEE, 1994.

Money, Steve A., "Teletext and Viewdata," Butterworth & Co. Ltd., London, 1979.

Mosley, J.D., "NAPLPS chip sets, though scarce, satisfy limited US videotex demand," EDN, Mar. 21, 1985, at 57.

Owen, Kenneth "How dial-a-fact is coming closer to home," The Times, Sep. 30, 1977.

Owen, Kenneth, "Why the Post Office is so excited by its plans for a TV screen information service," The Times, Sep. 26, 1976.

Periodical RFE, vol. 9'95, p. 100: Trend and Technology Open TV for Interactive Television.

Poole, James, "Demand for Viewdata grows," Sunday Times, Feb. 10, 1977.

Printout from Google News Archives, Mar. 22, 2007.

Qayyum, Hamid, "Using IVDS and VBI for Interactive Television," IEEE, Jun. 10, 1996.

Rajapakshe et al., "Video on demand," (last modified Jun. 1995) <http://www-dse.doc.ic.ac.uk/~nd/suprise_95 /Journal/vol4/shr/report.html>.

Rath et al., "Set-Top Box Control Software: A Key Component in Digital Video," Philips Journal of Research, vol. 50, No. 1/2 1996, at 185.

Reaching your subscribers is a complex and costly process—until now, from the Internet at http://www.evolveproducts.com/info.html, printed on Dec. 28, 1998.

Rick Boyd-Merritt, "Television wires two-way video," Electronic Engineering Times, Apr. 25, 1994.

Rosch, Gary D., "New data and information system set for commercial market trial," Telephony, Mar. 20, 1978, at 96.

Ruffler et al., "InfoRadio on Demand, WebTV and digiTaz—Telecommerce Case Studies," May 23, 1996.

Ryan, Margaret, "Interactive TV Takes a Corporte Twist," Electronic Engineering Times, Jul. 10, 1995.

Sandringham, St. John, "Dress rehearsal for the PRESTEL show," New Scientist, Jun. 1, 1978, at 586.

Selected pages from the "BBC Online—Schedules" web page. This web page is located at http://www.bbc.co.uk/schedules/ (as printed from the Internet on Oct. 19, 1999 and being dated as early as May 24, 1997).

Sharpless et al., "An advanced home terminal for interactive data communication," Conf. Rec. Int. Conf. Commun. ICC '77, IEEE, Jun. 12-15, 1977, at 19.6-47.

Statement in an Examination Report dated Aug. 2, 1999 for a counterpart foreign application filed in New Zealand in which the foreign Examiner alleges that he has used the Internet to access television listings for BBC World television as far back as mid 1996 . . . .

Stickland, D. C., "It's a common noun," The Economist, Jun. 5, 1978.

Stokes, Adrian, "The viewdata age: Power to the People," Computing Weekly, Jan. 1979.

Sun's Next Steps in Digital Set-Tops, article in Cablevision, p. 56, Nov. 16, 1998.

Teletext presents the alternative view, Financial Times, Oct. 24, 1977.

The clickTV television program guide website of TVData of Queensbury, New York. This website is located at www.clicktv.com (as printed from the Internet on Aug. 13, 1997).

The Evolve EZ Guide. The Remote Control, from the Internet at http://www.evolveproducts.com/display2.html, printed on Dec. 28, 1998.

The InfoBeat television program guide website of InfoBeat, Inc. This website is located at www.infobeat.com (as printed from the Internet on Dec. 8, 1997).

The television program guide website of Gist Communications, Inc. of New York, New York. This website is located at www.gist.com (as printed from the Internet on Aug. 14, 1997).

The television program guide website of TV Guide Entertainment Network. This website is located at www.tvguide.com (as printed from the Internet on Aug. 14-22, 1997).

TV Guide movie database Internet web pages printed on Aug. 12, 1999 (9 pages).

UVSG Offers System-Specific Web Site Development for OPS, press release of United Video Satellite Group, Apr. 12, 1996.TV Listings Functional Spec., Time Video Information Services, Inc., undated.

UVSG Teams With Microsoft on Internet Information Server, press release of United Video Satellite Group, Feb. 22, 1996.UVSG Offers System-Specific Web Site Development for OPS, press release of United Video Satellite Group, Apr. 12, 1996.

Viewdata and its potential impact in the USA: Final Report/Volume One, The UK Experience, Link and Butler Cox & Partners Limited, Oct. 1978.VideoGuide, "VideoGuide Users Manual," pp. 1-27 (p. 11 is the most relevant).

Viewdata moves in US but GEC may lose out, Computing Weekly, Jan. 25, 1978.

Viewdata Service Terminal Specification, British Post Office, Issue 5, Aug. 1978.

Web TV and Its Consumer Electronics Licenses debut First Internet Television Network and Set Top Box XP 002113265 Retrieved from the Internet: <URL http://www.webtv.net/company/news/archive/License.html> 'retrieved on Aug. 25, 1999.

What is Jini?, from the Internet at http://java.sun.com/products/jini/whitepapers/whatsjini.pdf, printed on Jan. 25, 1999.

Whitehorn, Katharine, "Viewdata and you," Observer, Jul. 30, 1978.

Why Jini Now?, from the internet at http://java.sun.com/products/jini/whitepapers/whyjininow.pdf, printed on Jan. 25, 1999. The document bears a copyright date of 1998.

Wikipedia article on CompuServe, Mar. 22, 2007.

Yoshida, Junko, "Interactive TV a Blur," Electronic Engineering Times, Jan. 30, 1995.Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.

* cited by examiner

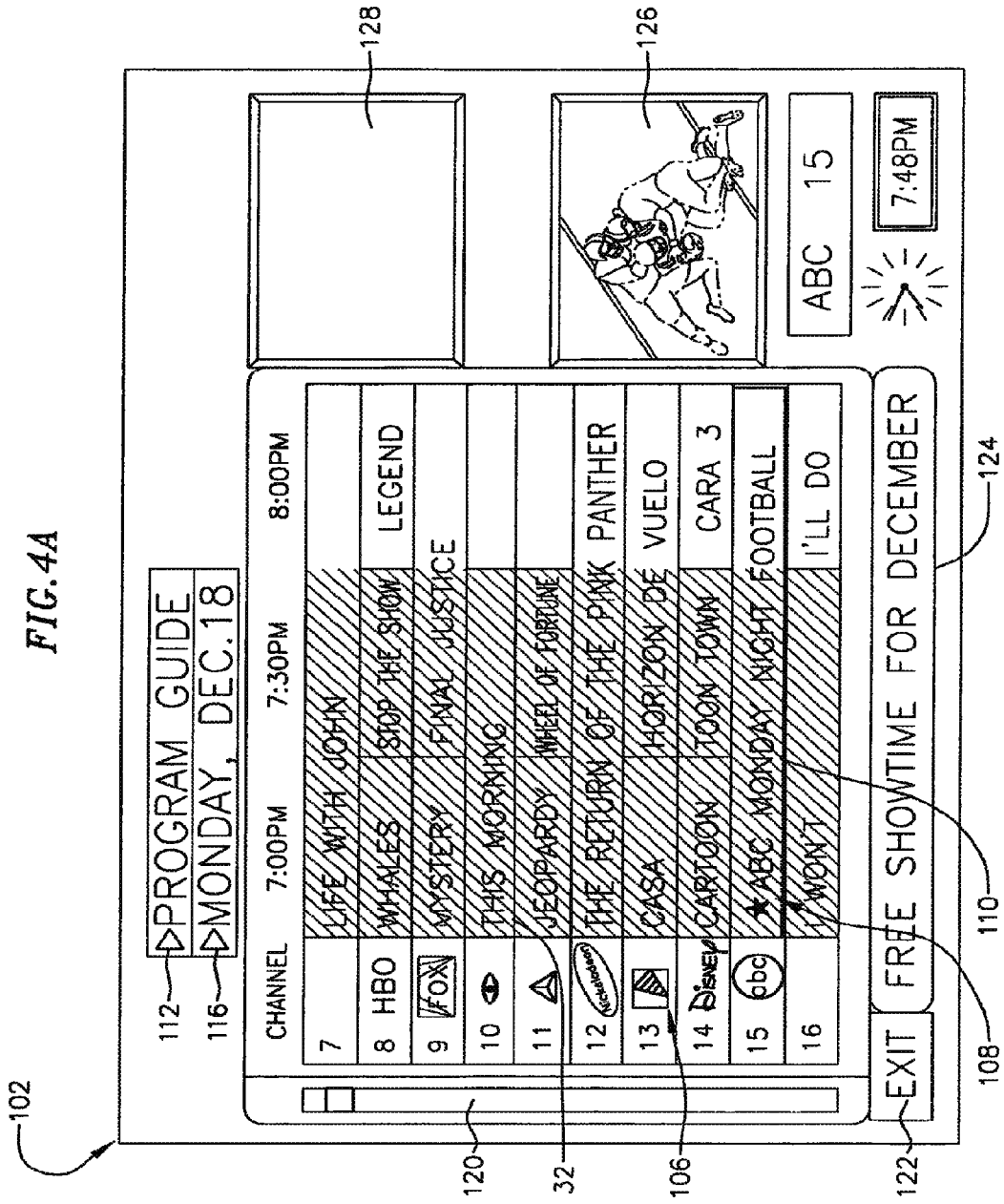

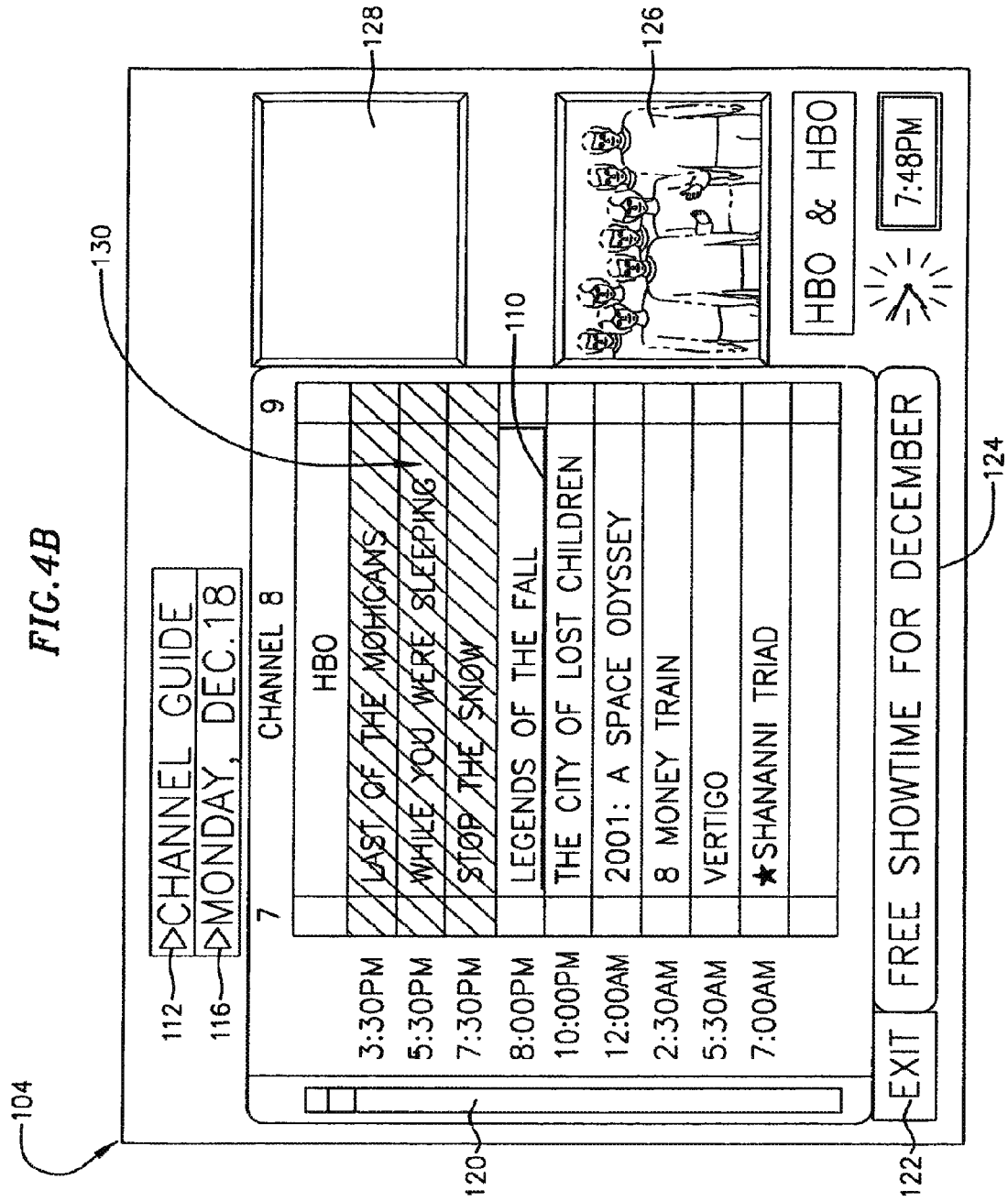

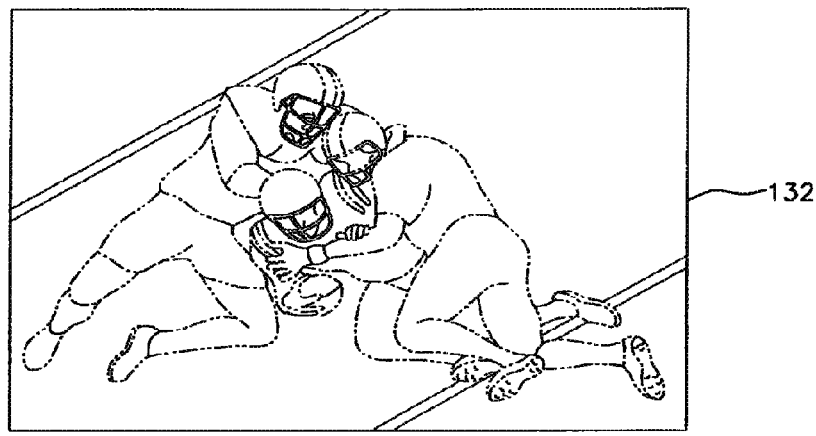
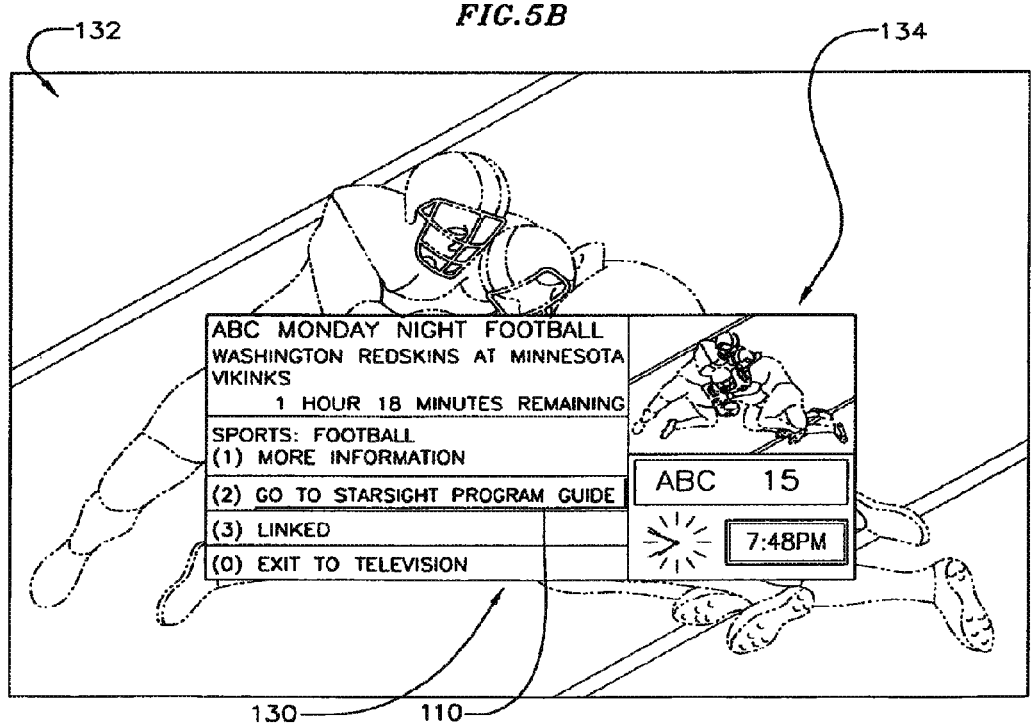

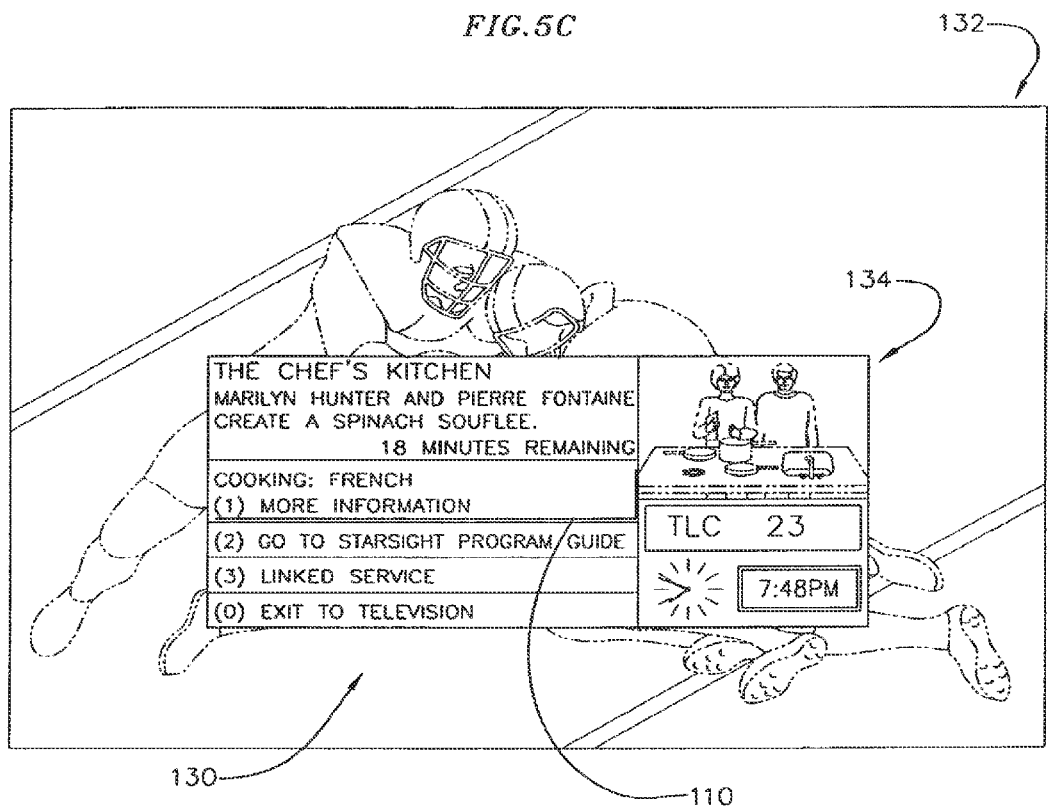

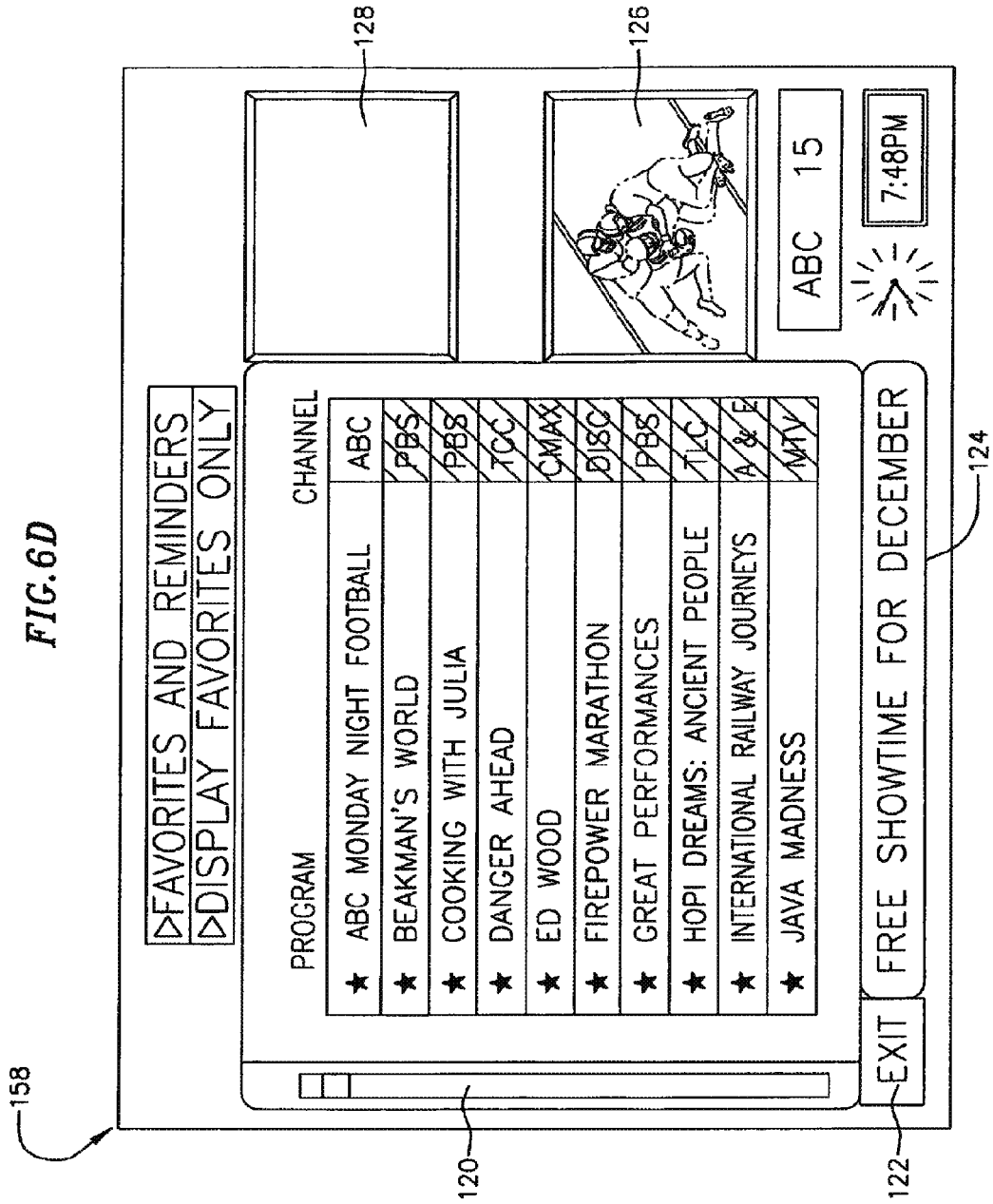

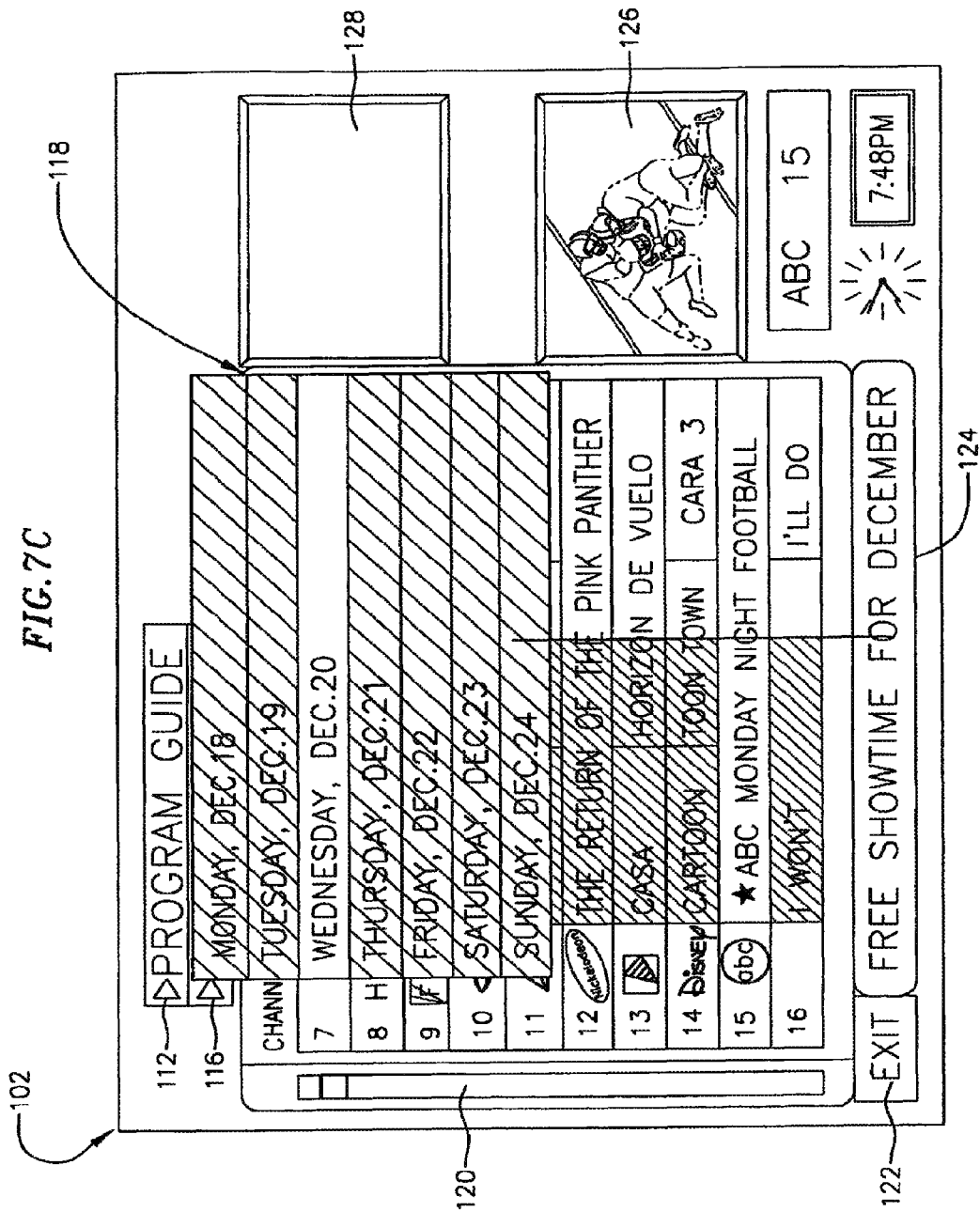

FIG.8C

```
ABC MONDAY NIGHT FOOTBALL
WASHINGTON REDSKINS AT MINNESOTA VIKINGS.
LIVE COMMENTARY BY FRANK GIFFORD AND
THE ABC CREW.
                    1 HOUR 18 MINUTES REMAINING
SPORTS: FOOTBALL
(1) MORE INFORMATION (2) RECORD ONCE
  (3) RECORD DAILY
  (4) RECORD WEEKLY
  (C) BACK TO PREVIOUS MENU (0) GO BACK TO PROGRAM GUIDE
```

```
ABC MONDAY NIGHT FOOTBALL
WASHINGTON REDSKINS AT MINNESOTA VIKINGS.
LIVE COMMENTARY BY FRANK GIFFORD AND
THE ABC CREW.
THERE IS ROOM FOR SEVERAL ADDITIONAL LINES
OF DESCRIPTION INFORMATION

SPORTS: FOOTBALL
(1) MORE INFORMATION
(2) TUNE TO THIS CHANNEL
(0) GO BACK TO PROGRAM GUIDE
```

```
LEGENDS OF THE FALL
THREE SONS OF A RETIRED ARMY OFFICER
RETURN FROM WORLD WAR 1 TO PURSUE VERY
DIFFERENT LIVES.
ANTHONY HOPKINS, BRAD PITT, JULIA ORMOND
                                     2 HOURS
```

| MOVIES: DRAMA |
|---|
| (1) MORE INFORMATION |

| (2) TUNE TO THIS CHANNEL NOW |
|---|
| (3) RECORD THIS PROGRAM |
| (4) PUT THIS PROGRAM ON MY FAVORITES LIST... |
| (5) REMIND ME WHEN THIS PROGRAM AIRS |
| (6) RESTRICT ACCESS TO THIS PROGRAM |
| (7) LINKED SERVICE |

| (0) GO BACK TO PROGRAM GUIDE |
|---|

130 points to the middle box.

FIG. 9B

| (2) INDIVIDUAL PROGRAM |
|---|
| (3) SERIES AS A WHOLE |
| (4) PERFORMERS |
| (5) CATEGORY |
| (6) GO TO FAVORITES LIST |
| (C) BACK TO PREVIOUS MENU |

155 points to (6) GO TO FAVORITES LIST.

FIG. 9C

| (2) INDIVIDUAL MOVIE |
|---|
| (3) DIRECTOR |
| (4) PERFORMERS |
| (5) CATEGORY |
| (6) GO TO FAVORITES LIST |
| (C) BACK TO PREVIOUS MENU |

156 points to (6) GO TO FAVORITES LIST.

FIG. 9F

| DISPLAY ALL FAVORITES AND REMINDERS |
|---|
| DISPLAY FAVORITES ONLY |
| DISPLAY REMINDERS ONLY |
| CLEAR MY LIST OF FAVORITES |
| CLEAR MY LIST OF REMINDERS |
| SHOW OTHER USER |

FIG.10A

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
2 HOURS

MOVIES: DRAMA
(1) MORE INFORMATION (2) TUNE TO THIS CHANNEL NOW
(3) RECORD THIS PROGRAM
(4) PUT THIS PROGRAM ON MY FAVORITES LIST
(5) REMIND ME WHEN THIS PROGRAM AIRS...
(6) RESTRICT ACCESS TO THIS PROGRAM
(7) LINKED SERVICE (0) GO BACK TO PROGRAM GUIDE

130

FIG.10B (2) REMINDER ONCE
(3) REMINDER FOR WEEKLY SERIES
(4) GO TO REMINDERS LIST
(C) BACK TO PREVIOUS MENU

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
2 HOURS

MOVIES: DRAMA
(1) MORE INFORMATION (2) TUNE TO THIS CHANNEL NOW
(3) RECORD THIS PROGRAM
(4) PUT THIS PROGRAM ON MY FAVORITES LIST
(5) REMOVE THIS PROGRAM'S REMINDER...
(6) RESTRICT ACCESS TO THIS PROGRAM
(7) LINKED SERVICES (0) GO BACK TO PROGRAM GUIDE

ENTERING PASSWORD
BY ENTERING YOUR PASSWORD YOU ARE CONFIRMING A PURCHASE OR VALIDATION OF YOUR ID. PLEASE ENTER YOUR PASSWORD TO ORDER THIS MOVIE FOR THE LISTED PURCHASE PRICE.

HELP: PASSWORD
(1) INFO ON (LEGENDS OF THE FALL)—  $3.95

ENTER PASSWORD FOR DELIVERY IN 7 MINUTES
@7:55PM   (LEGENDS OF THE FALL)  $3.95
. . . . . . . . . . . .

(2) ACCEPT PASSWORD...
(<) BACK TO PREVIOUS MENU (0) GO BACK TO PROGRAM GUIDE

FIG. 11D

CONFIRMING YOUR PURCHASE
YOU HAVE SUCCESSFULLY ENTERED YOUR PASSWORD. CLICKING ON "YES" ITEM WILL FINALIZE YOUR PURCHASE.

HELP: CONFIRMING YOUR PURCHASE
(1) INFO ON (LEGENDS OF THE FALL)    $3.95

YOU HAVE SUCCESSFULLY ENTERED YOUR PASSWORD. ARE YOU SURE YOU WANT TO PROCEED TO FINALIZE YOUR ORDER ?

(2) YES
(<) NO (BACK TO PREVIOUS MENU)

(0) GO BACK TO PROGRAM GUIDE

FIG. 11E

LEGENDS OF THE FALL
THREE SONS OF A RETIRED ARMY OFFICER RETURN FROM WORLD WAR 1 TO PURSUE VERY DIFFERENT LIVES.
ANTHONY HOPKINS, BRAD PITT, JULIA ORMOND
            VIDEO ON DEMAND PRICE—$3.95

MOVIES: DRAMA
(1) MORE INFORMATION

170

YOUR ORDER CONFIRMED !
12.15.95    OR.#950384383    IT.#345VODL
ACCOUNT 234.95430        PURCHASE: $3.95

(2) OK (BACK TO PREVIOUS MENU)
(3) GO TO YOUR LIST OF PURCHASES (0) GO BACK TO PROGRAM GUIDE

METHOD AND SYSTEM FOR DISPLAYING ADVERTISING, VIDEO, AND PROGRAM SCHEDULE LISTING

CROSS-REFERENCE TO RELATED APPLICATION

This application is a continuation of U.S. patent application Ser. No. 11/894,687, filed on Aug. 20, 2007, which is a continuation of U.S. patent application Ser. No. 11/502,691, filed on Aug. 11, 2006 (now abandoned), which is a continuation of U.S. patent application Ser. No. 10/406,745, filed on Apr. 3, 2003, which is a continuation of U.S. patent application Ser. No. 09/962,692, filed on Sep. 25, 2001 (now abandoned), which is a continuation of U.S. patent application Ser. No. 08/847,726, filed on Apr. 28, 1997 (now U.S. Pat. No. 6,323,911), which is a continuation-in-part of U.S. patent application Ser. No. 08/537,650, filed on Oct. 2, 1995 (now abandoned), and claims priority of U.S. Provisional Application No. 60/023,651, filed on Jun. 17, 1996, each of which is fully incorporated herein by reference in its respective entirety.

This application is also related to U.S. patent application Ser. No. 08/837,025 filed Apr. 11, 1997 and its Appendices A, B, and C of U.S. patent application Ser. No. 08/837,025, each of which is fully incorporated herein by reference in its respective entirety.

BACKGROUND OF THE INVENTION

The present invention generally relates to television schedule information, and more particularly to a system and method for displaying a television program guide on a television screen.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased. Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. One such challenge is providing a system and method that allows the viewer to quickly and efficiently navigate through the various menus and submenus of the schedule guide and to interact with the items contained therein. Ideally, the system and method would provide the viewer with the ability to browse through the television guide and/or perform various actions, while still displaying the currently-tuned program on the television screen so that the viewer can keep track of the program. In addition, it would be desirable to provide a system that can be customized for an individual and/or a group of viewers.

SUMMARY OF THE INVENTION

The present invention provides a system and method for displaying schedule information on a visual interface, such as a television screen, a computer monitor or the like. The present invention also provides a system and method for allowing the viewer to navigate and interact with a program guide that is displayed, for example, on the viewer's television screen. The program guide will usually include a schedule information area that depicts the programs that are being presented on each channel at each time during the day. with an input device, such as a remote control device, pointing device, mouse, keyboard, microphone or the like, the viewer can browse through the schedule information area and/or obtain more information about programs of particular interest.

In one aspect of the invention, a system and method is provided for allowing the viewer to watch a program on the currently-tuned channel of a television, while browsing through the other channels on a portion of the television screen. The system includes a browsing window for displaying program information over a portion of the television screen in conjunction with the primary display. The browsing window is usually smaller than the main program guide and located in a convenient place on the television screen, e.g., in a corner, so that the viewer can simultaneously view the primary display and the browsing window. The browsing window includes an active window for displaying programs on channels other than the currently-tuned channel, and an input device for switching the program that is displayed on the active window. In a preferred configuration, the browsing window further includes an information window for allowing the viewer to access a television schedule program guide and to obtain more information on the program that is shown in the active window.

In another aspect of the invention, a system and method is provided for allowing the viewer to watch programs currently being shown on the television, while the viewer browses through the program guide. In this embodiment, the program guide includes a smaller, active window for displaying a program that is currently being shown on a television channel. The input device has a controller for interacting with the active window to control the program that is shown therein. For example, the active window may show the program on the currently-tuned channel, i.e., the channel that the viewer was watching prior to activating the program guide. Alternatively, the active window may show the programs that the viewer selects in the program information area. In this embodiment, each program title is contained within a cell or window. As the controller moves a cursor, for example, to each cell within the program information area, the program displayed on the active window will change so that the program displayed on the active window corresponds to the program title within the cell containing the cursor.

In yet another aspect of the invention, a system and method are provided for indicating the amount of time left in each program in the program guide. In this embodiment, the program guide includes a matrix of cells, with each cell containing information associated with a television program. and having a length that is proportional to a length of the television program. Each cell will include a visual display for displaying an amount of time left in the associated television program. For example, the visual display can be a physical icon indicating the amount of time left in the program. Alternatively, each cell can be highlighted in such a way that either the highlighted or non-highlighted portion of the cell represents the amount of time left in the associated television program. In the latter embodiment, the highlighted or non-highlighted portion of the cell will be reduced with time to continuously indicate the amount of time left in the associated program.

In yet another aspect of the invention, a system and method is provided for automatically or manually customizing the television schedule guide to an individual viewer or a group of viewers, e.g., a family. In this embodiment, the program guide includes a matrix of cells, with each cell containing information associated with a television program. The input device includes a controller for moving a cursor to each cell and for selecting the television program associated with each cell. The system further includes a memory for storing the television programs that have been selected by the viewer. The programs can be selected for a variety of reasons, such as designating the program as a favorite, placing a reminder to watch the program or, when the television schedule system includes a recording device, placing an automatic reminder to the program guide to record the program.

In a specific configuration, the system further includes a visual display, such as a physical icon within the program's cell, for indicating that a program has been selected. In addition, the program guide includes a selection window that displays some or all of the programs that have been selected by the viewer. The input device will allow the viewer to activate and deactivate the selection window, and to move between each program within the selection window and activate programs to obtain information associated with the selected program.

In a preferred embodiment, the system includes a database containing each program within the television schedule. The database may be included within a computer integrally combined with the television (e.g., PCTV), a computer that is coupled to the television through suitable lines, or the database may be accessed from a remote computer, e.g., via the Internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). In an exemplary embodiment, the computer will include a processor and suitable software for automatically searching the database for other programs having the same criteria. The processor may then place the programs that include the designated criteria into the selection window and provide visual indication of each program in the matrix of cells in the program guide. In this way, the program guide will automatically customize itself to the individual viewer to facilitate use of the television schedule.

BRIEF DESCRIPTION OF THE DRAWINGS

FIGS. 4A and 4B are schematic views of a representative program guide and a channel guide, respectively, for use with the remote control device of Fig. in a television schedule system.

FIGS. 5A-5C are schematic views illustrating a method for selecting a program information menu, moving to the program guide of FIG. 4A and browsing through information menus from other programs with the remote control device of FIG. 1.

FIGS. 6A-6D illustrate a method for navigating from the program guide to a mode menu and selecting a different mode.

FIGS. 7A-7D illustrate a method for navigating from the program guide to a submode menu and selecting a different submode.

FIGS. 8A-8D illustrate a method for opening an information menu, scrolling down to other options and opening an information submenu.

FIGS. 9A-9F illustrate a method for selecting a favorite item.

FIGS. 10A-10D illustrate a method for selecting a program reminder.

FIGS. 11A-11E illustrate a Video On Demand menu and an associated submode menu.

DESCRIPTION OF THE SPECIFIC EMBODIMENTS

The present invention provides a schedule system and method for displaying schedule information on a visual interface, such as a television screen, computer monitor or the like. The system and method is particularly useful for use with television schedule information. The television schedule information will be presented in a program guide having a schedule information area depicting the program that are being shown on each channel for a period of time, e.g., a day, week or longer. In one aspect of the invention, the viewer may watch a program on the currently-tuned channel, while browsing through the other channels on a portion of the television screen. In another aspect of the invention, the viewer may watch programs currently being shown on the television, while he or she browses through the program guide. In yet another aspect of the invention, the system includes a database, a processor and associated software for automatically customizing the television schedule guide to an individual viewer or a group of viewers, e.g., a family, to facilitate use of the television schedule.

The television schedule system will include an input device, such as a remote control device, pointing device, mouse, keyboard, microphone or the like, to allow the user to browse through the schedule information area and/or obtain more information about programs of particular interest. In a specific configuration, the input device will comprise a housing or casing and an input assembly on the exterior surface of the casing. The casing will usually resemble the generally rectangular shape of typical television remote control devices. However, the casing may also be similar to other convention input devices, such as a mouse, a joystick, a computer keyboard, etc., or the casing may have a specialized, non-conventional shape. The casing will include a controller for allowing the television viewer to move along the television screen either freely or through specific areas or windows on the screen. The controller may comprise a trackball, cursor controller, pointing device, a microphone for allowing voice activation, a number of keys or buttons that function to move the viewer around the screen, or the like. In the preferred embodiment, the controller comprises a scrolling mechanism for displacing a movable cursor through a matrix of cells or windows on the screen. The cursor may comprise a physical icon on the screen, or it may be represented by highlighting or other visual indications of the cells or windows that are scrolled through by the viewer.

Figure 1:
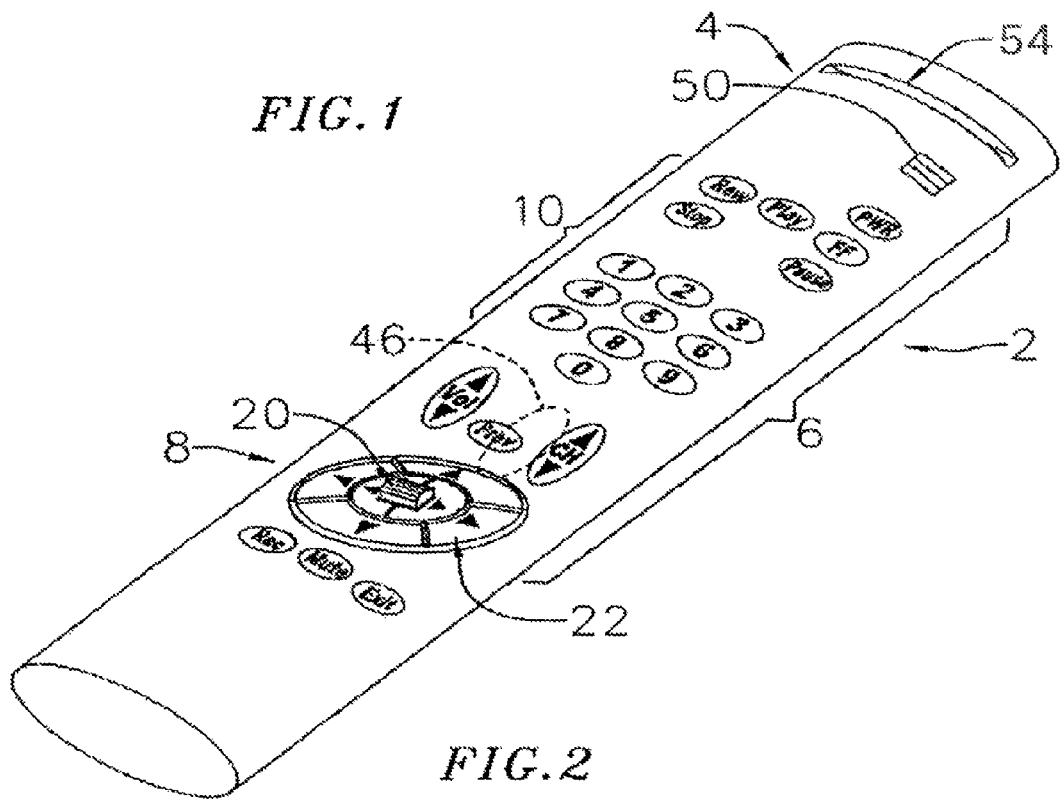
FIG. 1 is a perspective view of a remote control device according to the principles of the present invention.

Referring to the drawings in detail, wherein like elements are indicated by like numerals, a representative remote control device 2 for facilitating the use of television schedule system of the present invention is illustrated. Of course, it should be clearly understood that the remote control device shown in FIGS. 1 and 2 is merely representative of one type of remote control device that may be used with the present invention.

Figure 3:
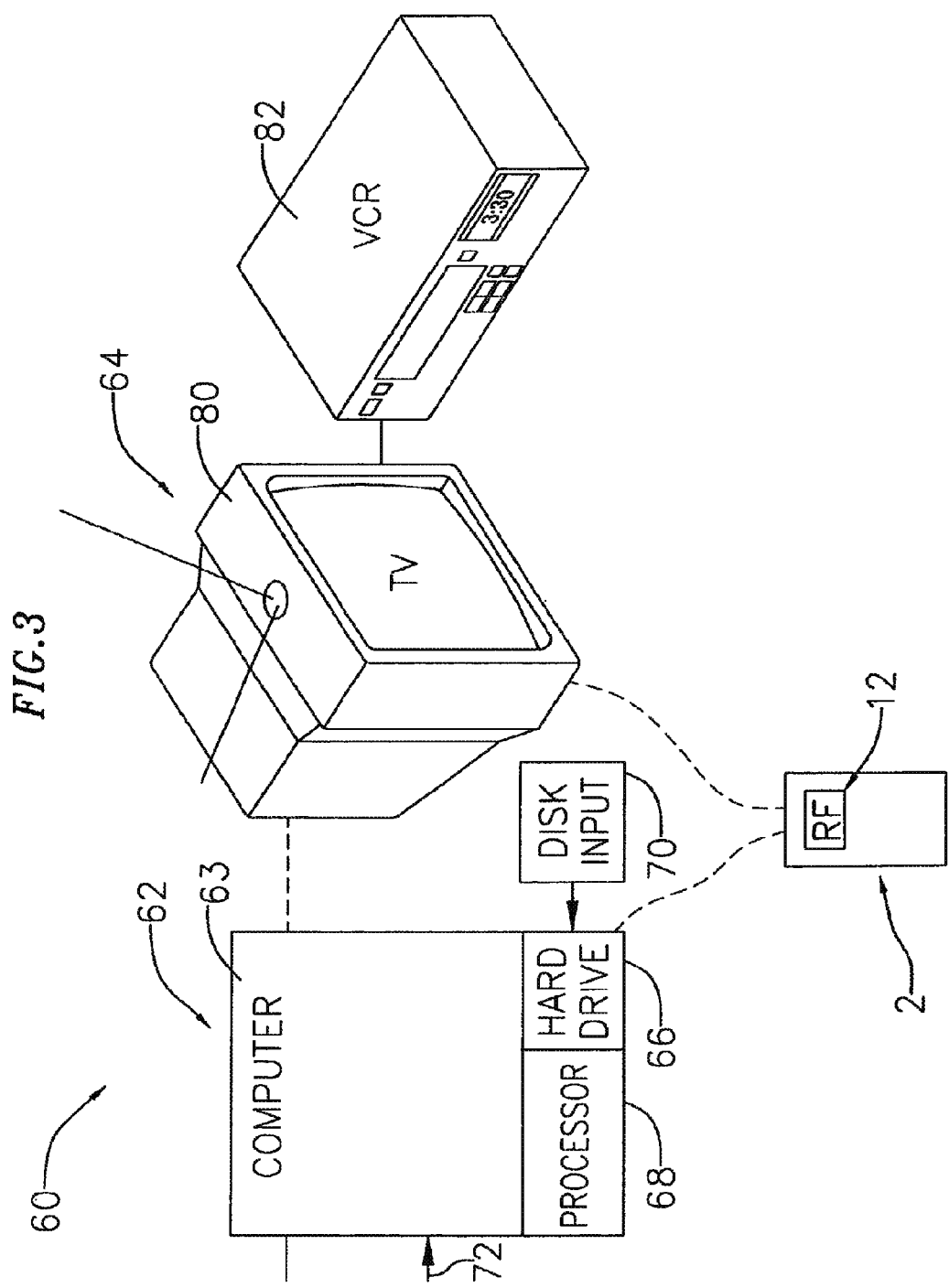
FIG. 3 is a schematic view of a representative computer system coupled to a television system incorporating the remote control device of the present invention.

As shown in FIG. 3, remote control device 2 generally comprises a casing 4 having a viewer input assembly 6 for controlling a television, computer or VCR and for utilizing television schedule information on a television screen, as discussed below. Input assembly 6 generally includes a cursor control assembly 8 for displacing a cursor on a display screen, such as a television screen, and a plurality of dedicated function buttons 10 for performing various functions, such as changing channels, operating a VCR, changing the volume, etc. In addition, dedicated function buttons 10 may be used for other interactions requiring numeric input, such as inputting security codes, credit card numbers, etc.

As shown in FIG. 3, remote control device 2 further includes an RF transmitter 12 for transmitting signals generated by the viewer through viewer input assembly 6 to, for example, a processor within a personal computer, a television or a VCR. RF transmitter 12 may be substituted with, for example, IR emitters, modulated light signals (i.e., a signal sent to optical fiber), or even a hardware connection. Remote control device 2 will also include a power source, such as a battery (not shown).

Figure 2:
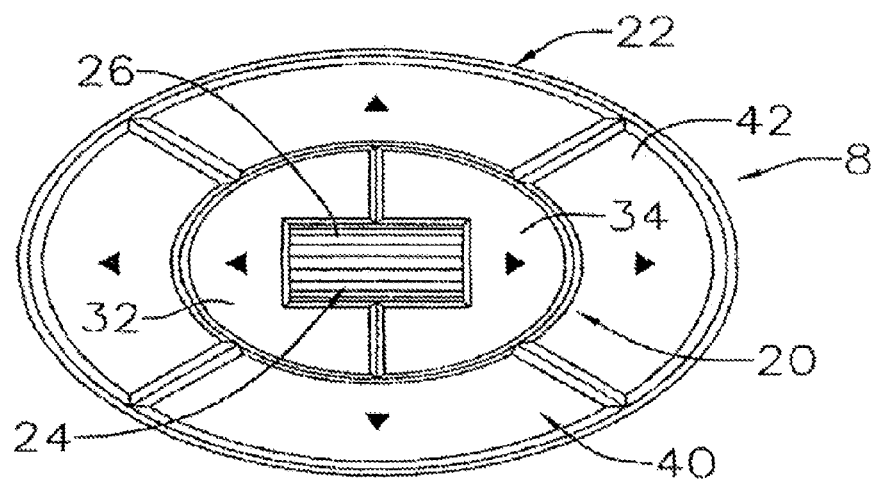
FIG. 2 is an enlarged view of local and global controllers of the remote control device of FIG. 1.

Referring to FIG. 2, the cursor control assembly 8 of the present invention will now be described in detail. Cursor control assembly 8 includes a local controller 20 for moving the cursor within a designated screen area or window on the display screen and a global controller 22 for navigating among different windows on the display screen, as discussed in further detail below. Local controller 20 comprises a vertical scroll mechanism for scrolling cursor in the y-direction or vertically through an individual window or menu. The vertical scroll mechanism is preferably a rolling cylinder 24 rotatably mounted to casing 4 around an axis perpendicular to the longitudinal axis of casing 4. Rotation of cylinder 24 moves the cursor vertically through the window or menu of the display screen. In a preferred embodiment, the window will be made up of at least a vertical column of cells and cylinder button 24 will move the cursor up and down the column.

Rolling cylinder 24 preferably includes means for providing tactile feedback to the viewer so that cylinder 24 to facilitate operation of cylinder 24 without looking at remote control device 2 (i.e., so the viewer can look at the television screen). In the preferred configuration, cylinder 24 includes a plurality. of detents or ridges 26 on its outer surface that indicate to the viewer, either by tactile feel or by sound, that the cursor is moving through each cell in the window or menu.

Local controller 20 further includes a horizontal scroll mechanism for moving the cursor in an "x" direction or horizontally across the display screen. As shown in FIG. 2, the horizontal scroll mechanism preferably includes first and second buttons 32, located on either side of rolling cylinder 24. Depressing buttons 32, 34 moves the cursor left or right across a row of items in an individual window of the display screen. Preferably, the viewer will be required to press one of the buttons 32, 34 for each item the cursor moves through in the horizontal direction. However, it should be noted that the invention is not limited to this configuration and buttons 32, 34 can be configured so that continuous depression of one button 32, 34 moves the cursor horizontally through a plurality of items. Alternatively, cylinder may be configured for horizontal movement so that both horizontal and vertical movement can be carried out with a single button.

Cursor control assembly 8 further includes a selector switch for selecting an item on the display screen when the cursor is contiguous with that item. In a specific configuration, the selector switch is rolling cylinder 24. Depression of cylinder 24 will select or activate the item or pull down a menu associated with that item. This feature of the present invention allows viewers to both vertically scroll through items in a menu and select these items without moving their thumb from cylinder 24.

Global controller 22 preferably comprises a screen navigation ring 40 having a plurality of direction buttons 42 surrounding local controller 20. The exact number of direction buttons 42 in navigation ring 40 will typically depend on the number and relative locations of the different information areas on the display screen. In a specific configuration, global controller 22 will include four buttons 42 controlling left, right, up and down movement of the cursor along the television screen.

As an alternative to navigation ring 40, remote control device 2 may include a trigger or clutch button 46, as shown in FIG. 1. Clutch button 46 can be depressed to provide dual modality for local controller 20. Specifically, pressing clutch button 46 will move local controller 22 between a first mode, Where cylinder 24 and horizontal scroll mechanism 30 move the cursor between different items within a particular information area on the display screen, and a second mode, where cylinder 24 and horizontal scroll mechanism 30 move the cursor between different information areas oh the screen. Clutch button 46 is preferably located on the back side of casing 4 so that the viewer can easily depress button 46 with his or her fingers when holding the device.

Referring again to FIG. 1, viewer input assembly 6 of remote control device 2 further includes a voice recognition device for receiving spoken commands from the viewer and converting the spoken commands into signals to facilitate use of television schedule information. Typically, the voice recognition device will include a microphone 50 on remote control device 2 for receiving the spoken commands and converting them into audio signals and a microprocessor (not shown) that includes speech recognition circuitry contained therein for receiving the audio signals and performing various tasks based on the spoken commands. The microprocessor may be contained within the remote control device or within a television set, a computer, VCR or the like. Alternatively, the speech recognition circuitry may be accessed from another computer or a datastream of information, such as a web site on the internet, and downloaded into the television schedule system.

The voice recognition device of the present invention may further include a trigger button (not shown) on remote control device 2 for activating or deactivating microphone 50. This allows the viewer to speak to other people in the room without accidentally triggering commands through microphone 50. The trigger button is normally in the up position, which corresponds to microphone 50 being in the deactivated state. When the viewer wishes to input a spoken command, message or data to the VCR, television or computer, the viewer must depress the trigger button which causes a signal to be sent to a processor (not shown) to activate microphone 50. Once microphone 50 is activated, it will input the received audio signals (e.g., spoken commands) to the processor.

Remote control device 2 further includes a mechanism for inputting and recognizing a viewer's identification (i.e., credit card number, social security number, etc.) for authorizing the viewer to purchase products or services from the television schedule system. In a preferred configuration, the identification mechanism is a slot 54 in casing 4 sized for receiving a credit card, data card, security card or other viewer identification card, as shown in FIG. 1. In this configuration, remote control device 2 includes a recognition device for reading a code on the credit card when the credit card is swiped through slot 54. A process will convert the credit card's code into signals representing the viewer's identification. Alternatively, the identification mechanism may comprise numeric or symbolic keys on casing 4, such as the numeric keys shown in FIG. 1. In this embodiment, the numeric keys may be used to input a security code, such as a credit card number, social security number or the like.

FIG. 3 illustrates a representative television schedule system 60 for use with remote control device 2 of the present invention. As shown, system 60 includes a computer system 62 coupled to a television system 64. In the preferred embodiment, computer system 62 includes a standard computer 63 which is, for example, any personal computer, (e.g., IBM compatible, Macintosh and the like). Computer 63 can also be located within a set top box (e.g., a DSS box), or the computer may be located remote from the viewer's home, e.g., an external server or host computer. In the latter embodiment, the television schedule system 60 will be capable of accessing and downloading an application or applet from the computer through, e.g., the internet or other communication media. The computer contains a hard drive 66 and a processor 68. These units are usually automatically included in the computer 63. A disk input 70 is used to provide the computer 63 with various additional software. A data line 72 is connected to an available serial, parallel or other data port on the computer 63. This line 72 is used to connect other devices/components to computer.

In another embodiment, computer system 62 may be combined with television system 60 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

Television system 64 includes a television 80 which may be any commercially available television. Television system 64 may or may not include a videotape recorder (VCR). In this embodiment, a VCR 82 is coupled to television. This VCR can be, for example, any commercially available VCR or any other type of recording device (analog or digital). Computer 63 and television 80 can be directly connected by a line 84 or remotely connected so that computer 63 and television 80 can be located in different rooms within a private residence or commercial building. In the preferred embodiment, a computer program provided on diskettes, CD Rom or other medium contains the software needed for receiving, organizing and displaying data for a television schedule guide (see FIGS. 4-11). These diskettes are inserted into disk input 70 and the software for these diskettes is stored within the computer 63 on the hard drive or on another mass storage location. This action can be performed by, for example, the viewer or service person. The computer program can also be provided, for example, via downloading from a satellite, transmission through the internet or other on-line service, or transmission through another type of land line. A more detailed description of a preferred computer system for use with the present invention is described in commonly assigned, co-pending U.S. patent application Ser. No. 08/537,650, filed Oct. 2, 1995, the complete disclosure of which is hereby incorporated by reference.

In another embodiment, computer system 62 may be combined with television system 60 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

In this embodiment, remote control device 2 will send input to computer 63, which then transmits signals, via an appropriate RF transmitter or the like (not shown), to television system 64. The data for the television schedule system can be obtained from a variety of databases. For example, on-line providers (Prodigy, America On Line, Compuserve, MSN, At&T, etc) may provide access to a database which contains the television schedule information. These online information providers can transmit data to television 80. To accomplish this, television 80 or computer 63 will include a modem, which can be connected to a telephone line, cable modem, ISDN line, DSS channel or the like, and software for searching and providing the data to computer 63.

FIGS. 4-11 illustrate a television schedule system and method according to the present invention. In Appendix B, which is attached to co-pending U.S. patent application Ser. No. 08/837,025, filed Apr. 11, 1997, of which has been incorporated by reference, entitled "Starsight Interactive Television Program Guide, Phase III", that further illustrates the representative television program guide. Appendix A, which is also attached to co-Pending U.S. patent application Ser. No. 08/837,025, filed Apr. 11, 1997, of which has been incorporated by reference, entitled "Using Starsight 2", to illustrate an alternative television program guide according to the present invention.

FIGS. 4A and 4B illustrate a program guide 102 and a channel guide 104, respectively, for the television schedule system of the present invention. The program guide 102, which is the primary mode in the television schedule system, includes a number of screen information areas or windows in a particular screen where the viewer operates an input device, such as the remote control device 2 described above, to move around vertically and horizontally and to interact with that screen area's function. Preferably, the currently active screen area will be indicated to the viewer, for example, by changing the background color from a light grayscale metallic to a brighter, active color. Within each screen area are one or more items, typically arranged in a matrix or grid so that the viewer can scroll through the grid. The items can be selected or activated with the input device. Activation of an item will invoke a Submenu, a Dialog, a Panel, invoke an action or the like. In an exemplary configuration, device 2 is configured so that double clicking on cylinder 24 will invoke an item's associated menu or Submenu and automatically activate the default menu item. In addition, device 2 may include further shortcuts, such as mediated signals that are accomplished by simultaneously holding in clutch button 46 and cylinder 24.

As shown in FIG. 4A, program guide 102 preferably includes a schedule information area 106 having a program matrix 108 of cells or items that depict the shows that are being presented on each channel at each time during the day. Program guide 102 conveniently lists the channels in a vertical column to the left of the program matrix 108 and the times in a horizontal row above matrix 108. As shown, the viewer may vertically scroll through a particular time or horizontally scroll through a channel. As the viewer scrolls through matrix 108, a cursor 110 will indicate the viewer's location within the matrix 108. Alternatively, the item may be automatically highlighted with a brighter color to indicate the viewer's location. Preferably, program matrix 108 will also be shaded to indicate. the portion of each show that has already been presented. For example, as shown in FIG. 4A, the shading extends to 7:48 (the current time as indicated at the bottom right of program guide 102) to indicate which portion of the show the viewer has already missed.

As shown in FIG. 4A, program guide 102 includes a number of other information areas. For example, program guide 102 includes a mode menu area 112 that indicates the currently active mode (i.e., program guide 102) and allows the viewer to pull down a mode menu 114 (see FIG. 6B). Program guide 102 also includes a date area 116 that indicates the date reflected in program matrix 106 and allows the viewer to pull down a date submenu 118 (see FIG. 7B) to change the date. In other submodes, the submode menu will display options for ordering or displaying lists that are appropriately related to the submode. A proportional scroll bar 120 located to the left of program matrix 106 is visually proportional to the total information in program matrix 106 to provide visual feedback as the viewer vertically scrolls through matrix 106. In addition, scroll bar 120 may be used for large-scale movement through hundreds of channels/sources by navigating to bar 120 and then vertically moving bar 120 upward or downward. An exit area 122 allows the viewer to immediately exit back to the television by navigating to exit area 122 clicking on exit area 122. A program area 126 depicts the currently tuned program and a preview window area 128 can be used for all types of promotional, descriptional, or contextual video or graphics, such as a short preview of the show that is currently being highlighted in show matrix 106. Preview window area 128 may also be interactional similar to the other areas of guide 102.

In an exemplary configuration, program area 126 displays the currently tuned program "live" so that the viewer can browse through program matrix 106 without missing the action on the currently tuned program. This feature allows the viewer, for example, to keep track of the score of a football game while browsing through the program matrix or performing other interactions with the system, such as purchasing goods or services, searching for more information on a program, etc. In another configuration, the viewer may set program area 126 to change as the viewer browses through program matrix 106 so that area 126 depicts the highlighted program in the matrix. This allows the television viewer to quickly view each program without exiting from the program guide 102.

The program guide may also include a variety of additional areas to facilitate use of the television schedule system, present information to the viewer or advertise programs or other products. For example, a scrolling commercial message 124 may be located underneath program matrix 106 that advertises programs or products from program sponsors, etc. The viewer may navigate to message 124 and click on the input device to receive more information or to purchase the product or program. A two second delay or a suitable input from the viewer will open the scrolling message up into its info menu (not shown). This function of ordering items is not limited to videos. For example, the program may access other contextual linked services such as a commercial store, etc., to allow the purchaser to buy a wide variety of different services or goods directly or indirectly linked to a particular program. For example, an Info Menu for Monday Night Football may allow the viewer to scroll through submenus that allow the viewer to purchase Washington Redskins' caps, Minnesota Vikings' caps or any NFL cap. The viewer has a choice to follow a program's link back to the commercial area where a larger selection of items and services are available. A product like the cap above may lead the viewer directly to an NFL proshop, whereas a link to a movie on demand may lead back to a commercial film library. A more complete description of a television schedule system incorporating contextual linked services is described in co-pending, commonly assigned U.S. patent application Ser. No. 08/837,025, filed on Apr. 11, 1997, to Schein et al., and its Appendices A, B, and C, the complete disclosure of which are hereby incorporated by reference.

FIG. 4B illustrates the television schedule system of the present invention in the channel guide mode. As shown, channel guide 104 is similar to program guide 102 except that it includes an information screen area 130 that is reversed from the information screen area 106 in the program guide. Thus, the viewer can scroll vertically to move forward and backward in time along one channel and horizontally to move from channel to channel.

A method for using the television schedule system of the present invention will now be described. FIGS. 5A-5C illustrate a method of accessing program guide 102 from a currently tuned program and browsing through other currently tuned programs. As shown in FIG. 5A, the viewer is watching a television show on a display screen 132, such as a Monday Night Football game featuring the Washington Redskins versus the Minnesota Vikings. Clicking on the input device automatically causes a Program InfoMenu 130 to pop up on a portion of the television screen 132 (see FIG. 5B). Program InfoMenu 130 may allow the viewer to obtain more information about the currently tuned program, move to program guide 102, move to contextual linked services (discussed below), or exit InfoMenu 130 back to the television show. The viewer may vertically scroll through these options, and select one of the options. For example, clicking on the "Go to program guide" section immediately transfers the viewer to the program guide, as shown in FIG. 4A.

To browse other currently tuned programs, the viewer employs the channel controls (i.e., function buttons 10, see FIG. 1). This allows the viewer to browse through other information menus while viewing the currently tuned program (see FIG. 5C). Alternatively, clutch button 46 may be depressed to switch the modality of local controller 20 and allow the viewer to browse through the channels with cylinder 24. This allows the viewer to browse without taking his or her thumb off cylinder 24 and without looking at remote control device 2. In an exemplary configuration, InfoMenu 130 includes a browsing window 134 that displays ("live") the program in InfoMenu (FIG. 5C). This feature allows the viewer to actually view the programs as he/she browses through them. A single click of cylinder 24 would take the viewer to the browsed program. The remote control device may also include means for switching the sound between the currently tuned program and the program in the browsing window 134.

Figure 6A:
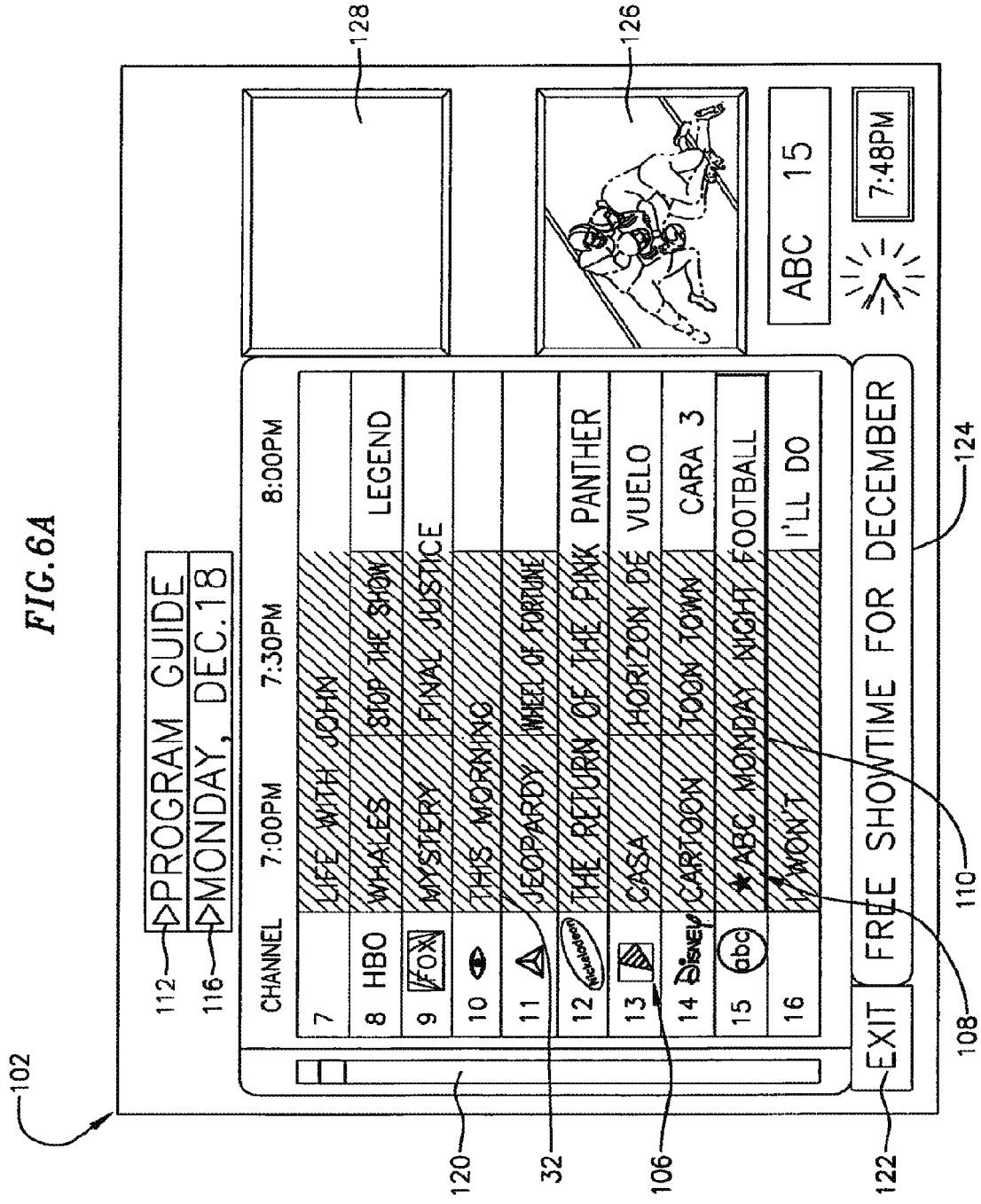
Figure 6B:
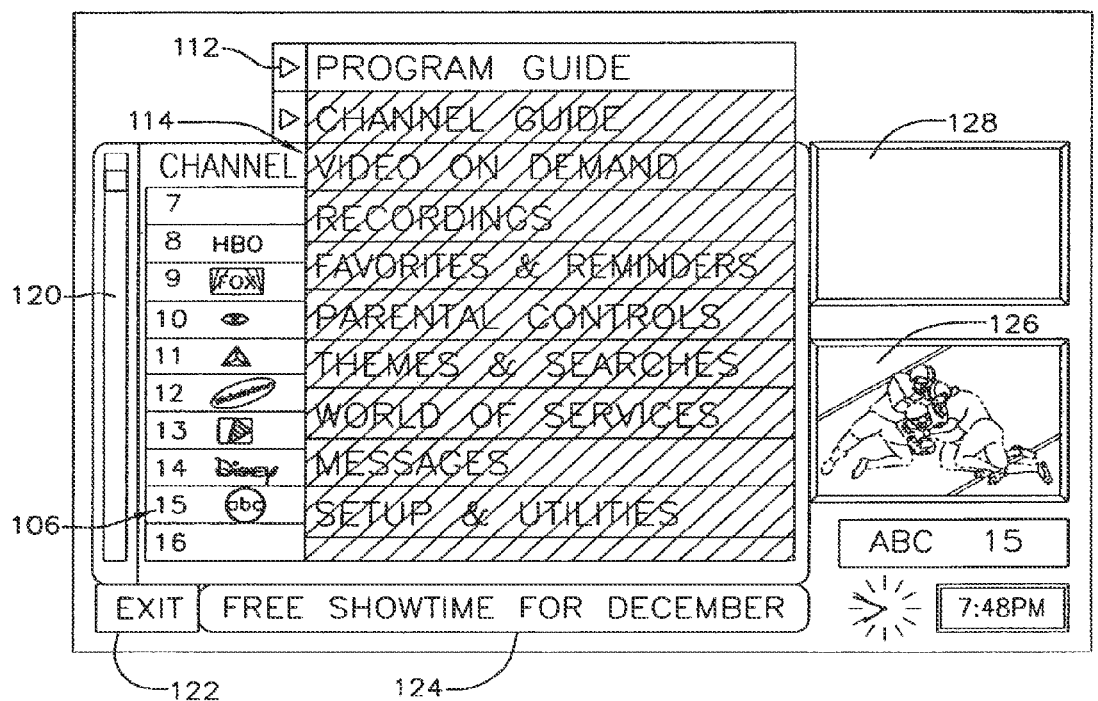
Figure 6C:
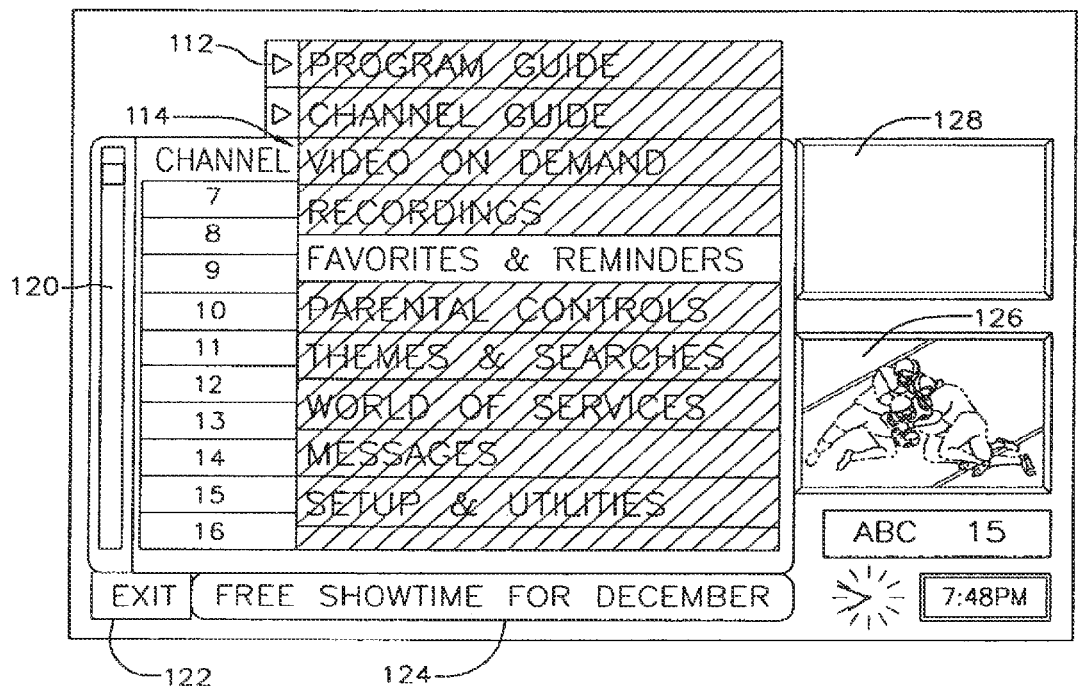

FIGS. 6A-6D illustrate a method for changing the mode of the television schedule system. As shown in FIG. 6A, the viewer starts in program guide 102, which can be accessed through the Infomenu 130 of the currently tuned program as discussed above or by double clicking on cylinder 24 from the television screen (which will automatically select the default item within the Infomenu). The viewer may navigate to the Mode Menu, which will automatically pull down, allowing the viewer to scroll up and down the list of modes and to click on a menu item to select a different mode. For example, if the viewer wishes to see the Favorites and Reminders Menu 158, the viewer clicks on "Favorites and Reminders" and moves to this mode, as shown in FIG. 6D. Note that the design of the representative remote control device 2 allows the viewer to easily scroll through the various menus of the program guide without looking at remote control device 2. In addition, the viewer can access various modes and scroll through the different menus simply by using his or her thumb.

Figure 7A:
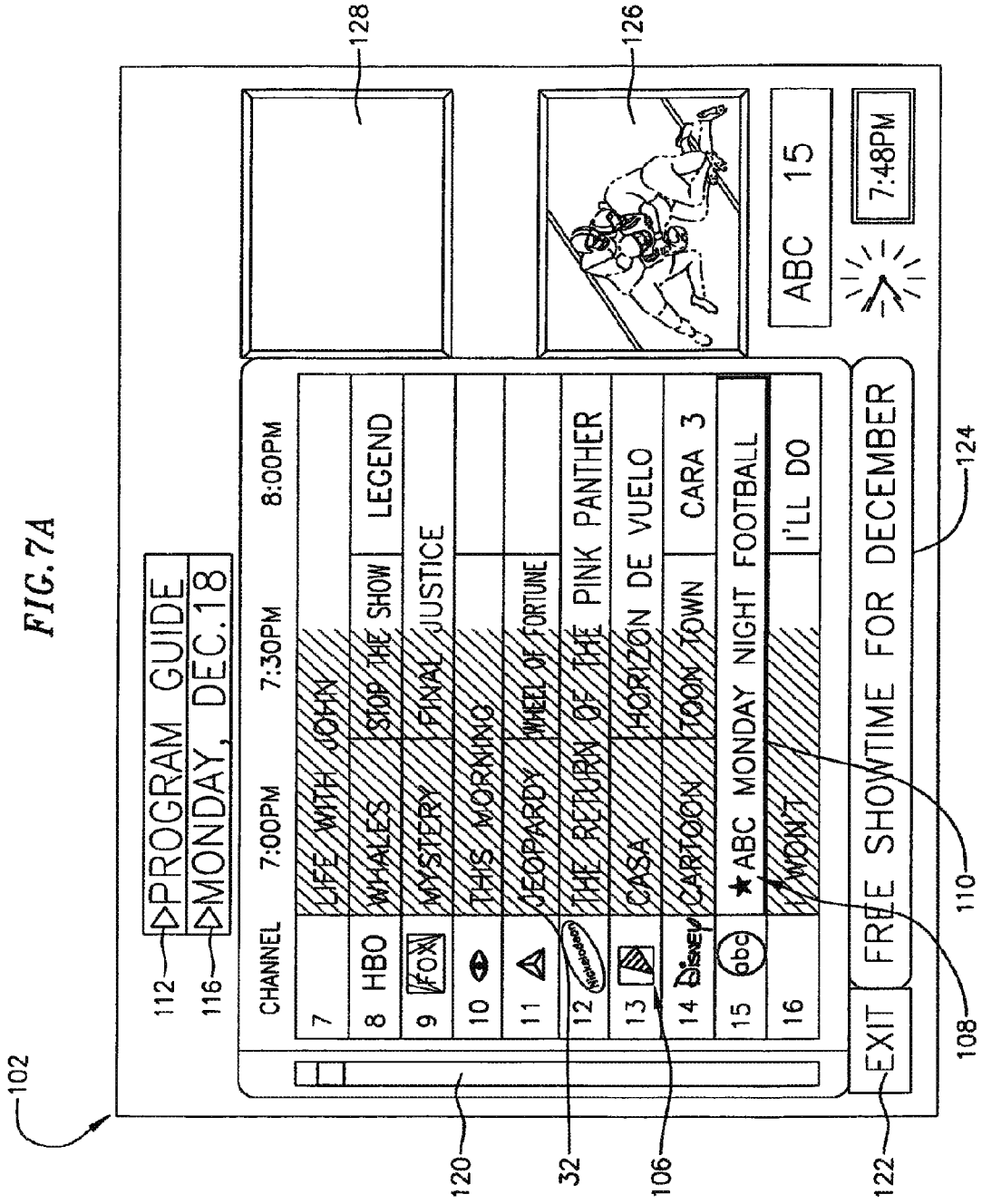
Figure 7B:
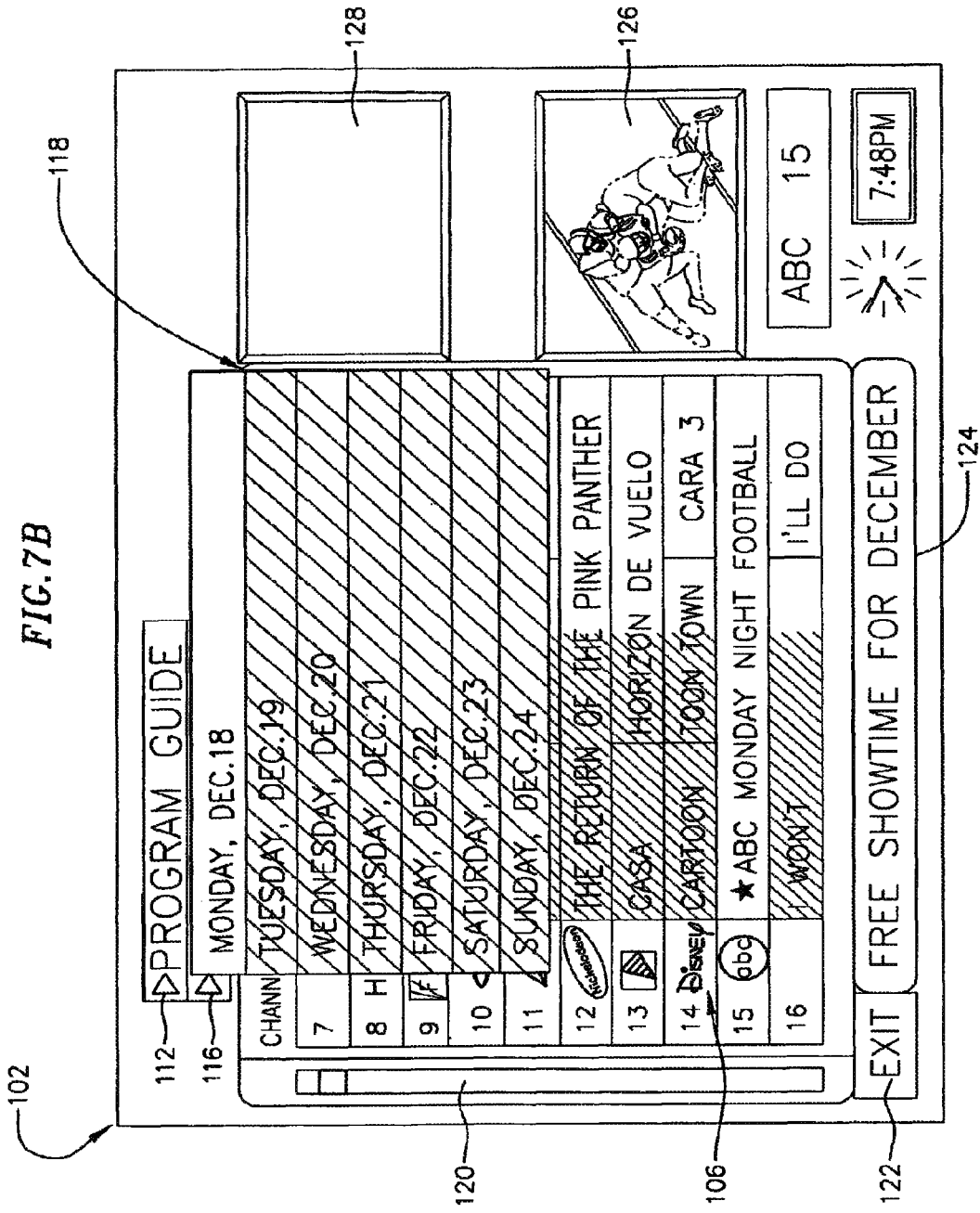
Figure 7D:
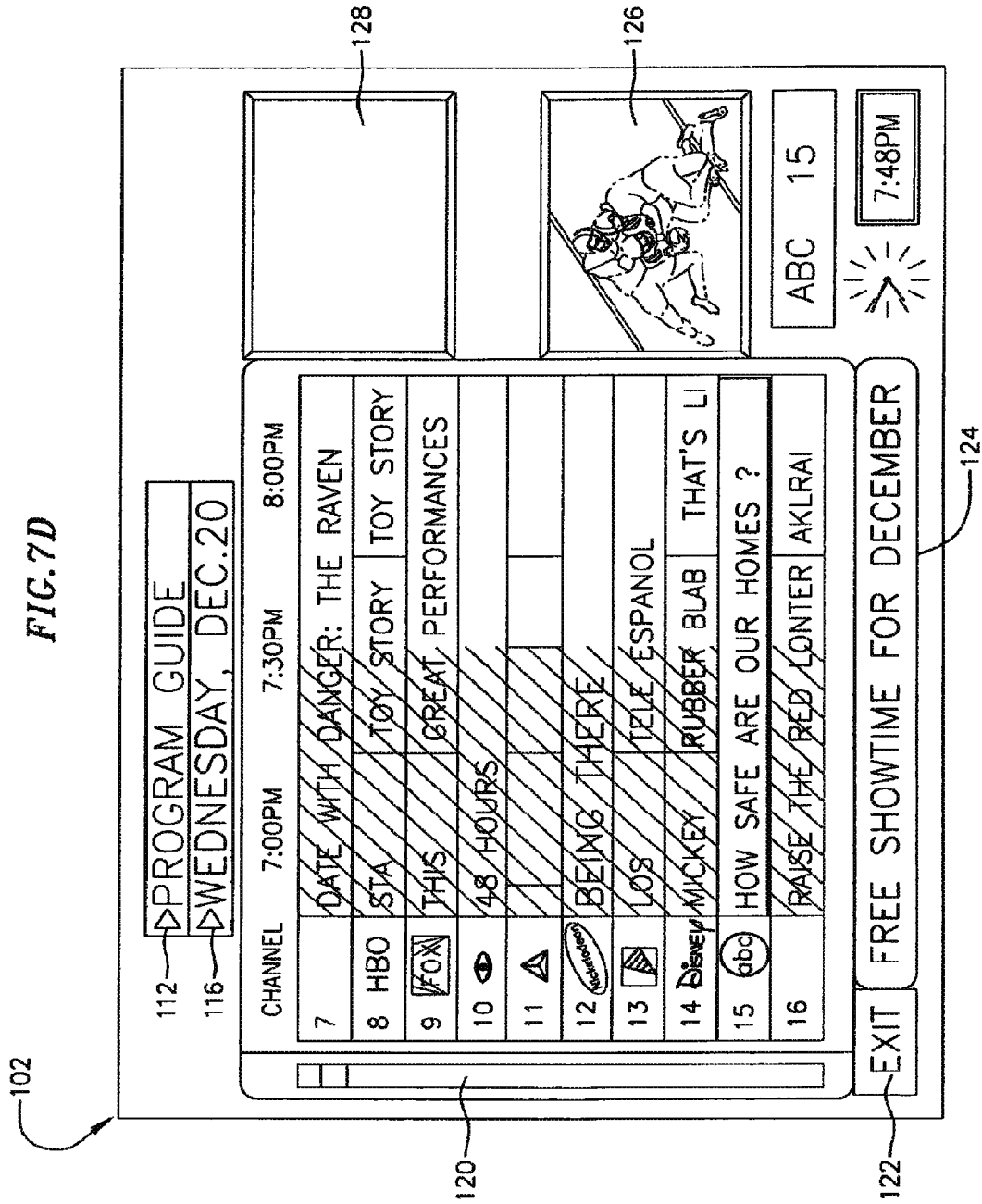

FIGS. 7A-7D depict a method of navigating to a submode menu with the program guide 102. One of the advantages of the television schedule system of the present invention is that the submode menus dynamically change depending on the Mode. For example, if the viewer desires to view the programs on a different day (other than the current day), he or she navigates to date area 116 by pressing once on upper button 42 of global controller 22. This moves the viewer to date area 116, where a submode menu 118 automatically scrolls down, as shown in FIG. 7B. The viewer may then scroll through the days of the week with rolling cylinder 24, which will become highlighted as the cursor moves through each day. To select another date, the viewer simply clicks on cylinder 24 and program matrix 106 jumps forward to another day, for example, Wednesday, as shown in FIG. 7D.

Figure 8A:
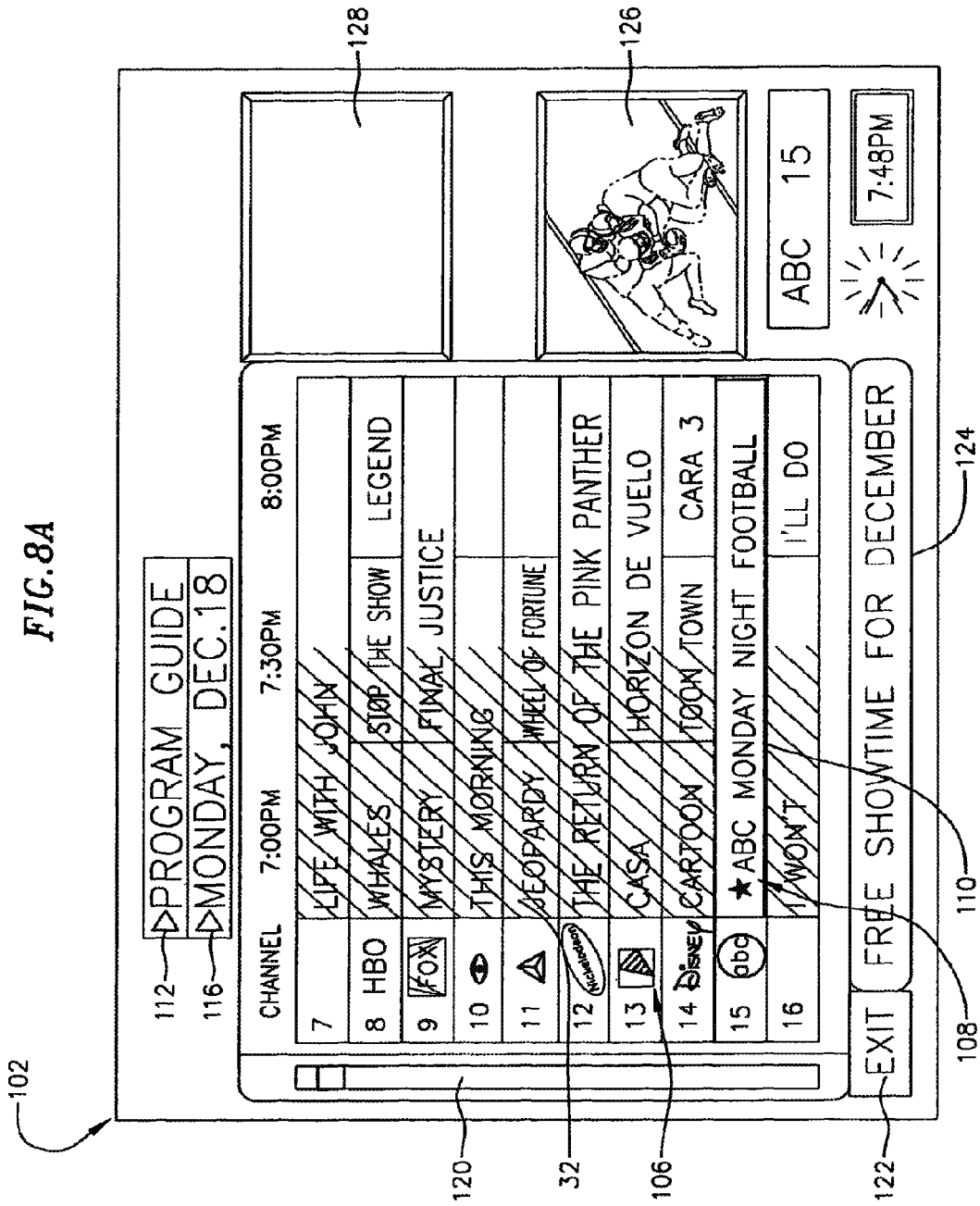
Figure 8B:
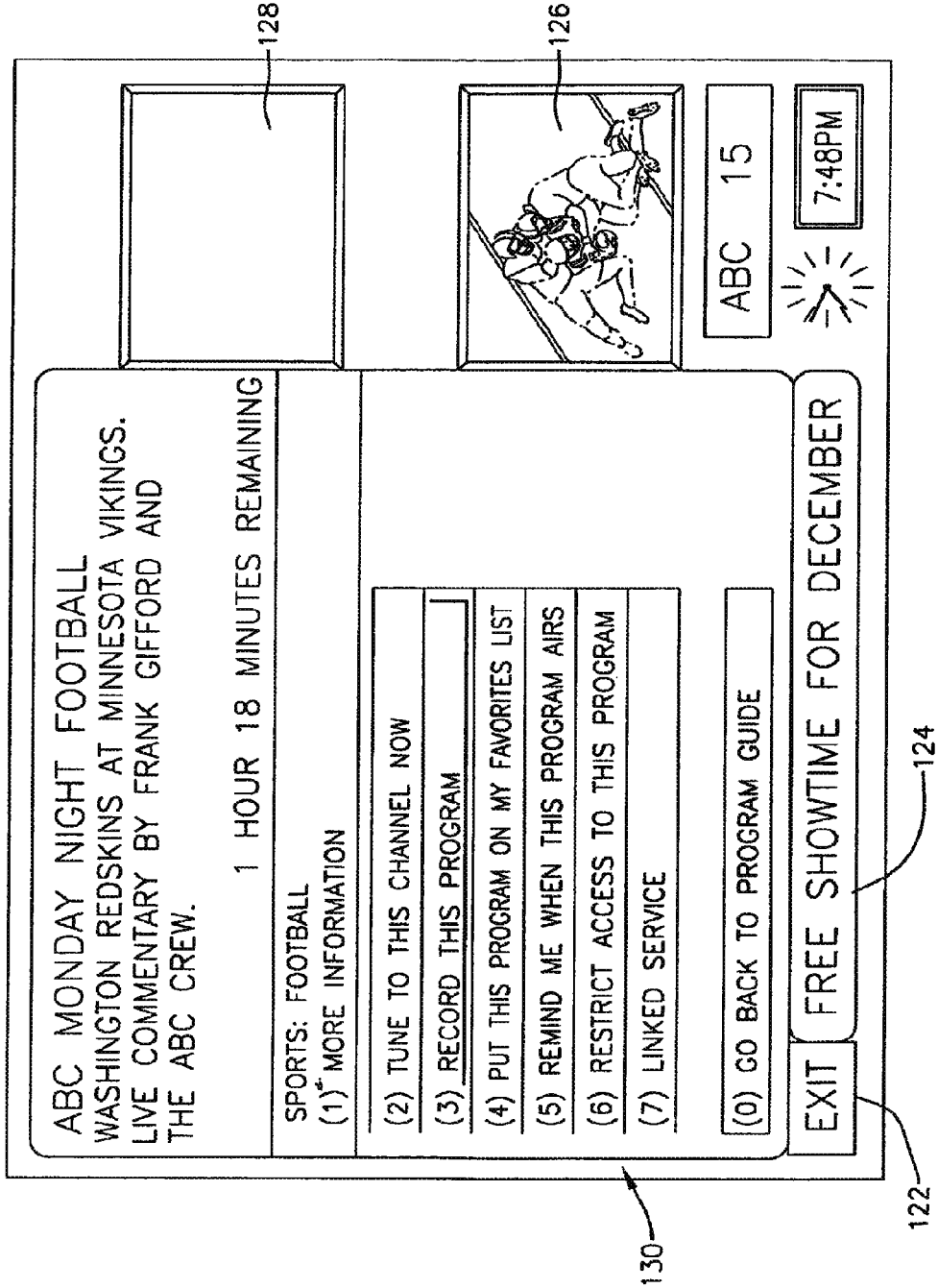

FIGS. 8A-8D illustrate a method of opening up Item Info-Menus with remote control device 2. As the viewer is scrolling around program matrix 106, clicking on a selected item will open up its InfoMenu 130, as shown in FIG. 8B. The InfoMenu 130 is a gateway to information about programs and items and services linked to them. For example, the viewer may scroll down InfoMenu 130 to the item "record this program". Once the item is selected, the viewer simply clicks on the item and a record submenu 152 appears where the viewer can specify how this program is to be added to the recording list (see FIG. 8C). The viewer can scroll up and down record submenu 152 and click on the desired choice. If the viewer scrolls up on the InfoMenu 130 instead of down, the info item will highlight in yellow and expand downward to review additional information about the program item, as shown in FIG. 8D. This expanded info item 154 will collapse automatically when the viewer scrolls downward.

The system and method of the present invention may be configured to automatically or manually customize the television schedule guide to an individual viewer or a group of viewers, e.g., a family. In this embodiment, the remote control, device may be used to select certain programs, and a memory stores the television programs that have been selected by the viewer. The programs can be selected for a variety of reasons, such as a designated the program as a favorite, placing a reminder to watch the program or, when the television schedule system includes a recording device, placing an automatic reminder to the program guide to record the program. In a specific configuration, the system further includes a visual display, such as a physical icon within the cell, for indicating that a program has been selected. In addition, the program guide includes a selection window that displays some or all of the programs that have been selected by the viewer. The input device will allow the viewer to activate and deactivate the selection window, and to move between each program within the selection window and activate programs to obtain information associated with the selected program.

In an exemplary embodiment, the system includes a database containing each program within the television schedule. The database may be included within a computer integrally combined with the television (e.g., PCTV), a computer that is coupled to the television through suitable lines, or the database may be accessed from a remote computer, e.g., via the internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). The computer will include a processor and suitable software for automatically searching the database for other programs having the same criteria. The processor will automatically place the programs that include the designated criteria into the selection window and provide visual indication of each program in the matrix of cells in the program guide. In this way, the program guide will automatically customize itself to the individual viewer to facilitate use of the television schedule.

Figure 9D:
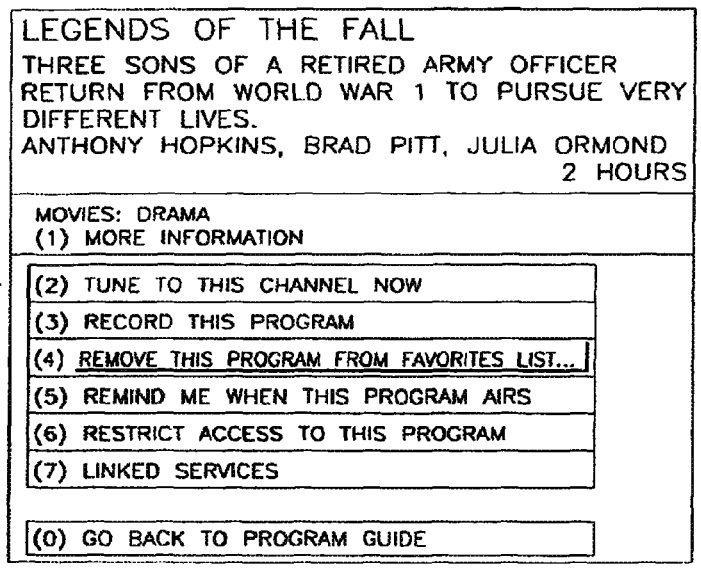
Figure 9E:
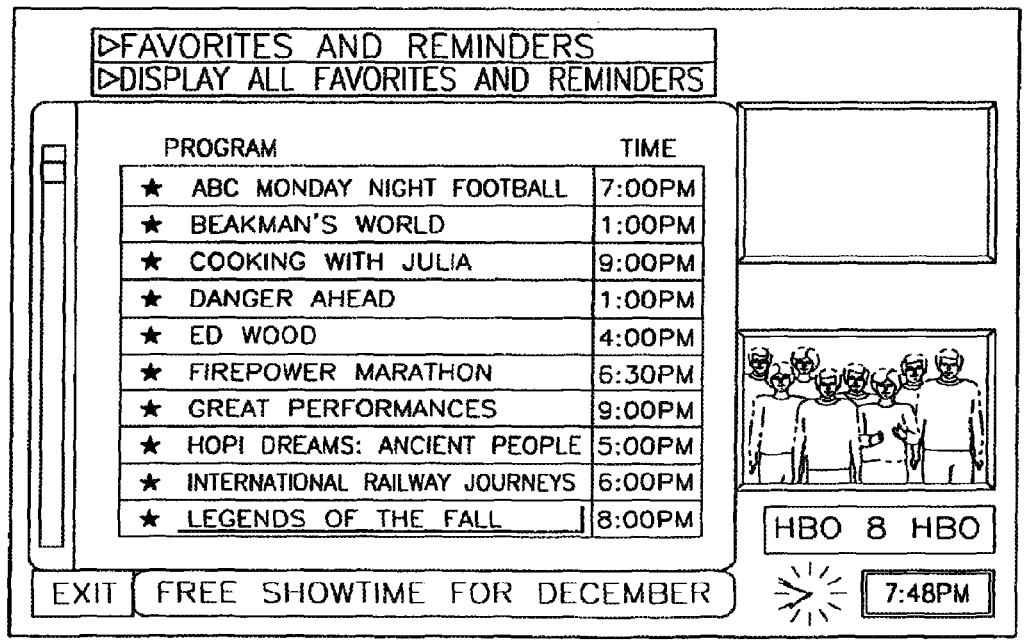

FIGS. 9A-9F illustrate a method for designating a program as a favorite. For example, an Item InfoMenu 130 is opened and the viewer scrolls down to section (4), and selects "Put this program on my favorite list" by clicking cylinder 24. A Favorites submenu automatically appears with a panel asking the viewer why this program has been shown as a favorite. For example, FIG. 9B illustrates a Favorites submenu 155 for a sitcom or program and FIG. 9C illustrates a submenu 156 for a movie. Other types of programs will have other unique submenus. The viewer is given a choice to scroll down to choose reasons for selecting the program as a favorite, such as performers; categories, series as a whole, etc. This feature could also be utilized to allow the viewer to go to the database of his or her preferences. It would then be possible to link to other programs with matching criteria, thereby allowing the viewer to customize the system to his or her needs. For example, if the viewer selects "performers" (see FIG. 9C), this would bring up a listing of known performers (or a similar appropriate listing) in this program. The viewer than identifies which ones are favorites. After specifying the criteria for being a favorite, a confirmation panel (not shown) may appear that allows the viewer to o.k. the action. When the viewer returns to the Items Info Menu, a favorite symbol has been added to the title and menu item (4) now gives the option to remove the program from the favorites list (see FIG. 9D). This cursor functionality is found throughout this system and is the easiest way to add or remove items from the list. After the program has been selected as a favorite, it is added to the Favorites and Reminders list 158, as shown in FIG. 9E. The system will then automatically search the guide to determine which programs include the specified performers. In addition, the system may be configured to continuously perform this search as new programs appear in the guide each day. Henceforth, some or all program items containing the viewer's specified performers would be marked with a star and appear on the "favorites" list.

Figure 10D:
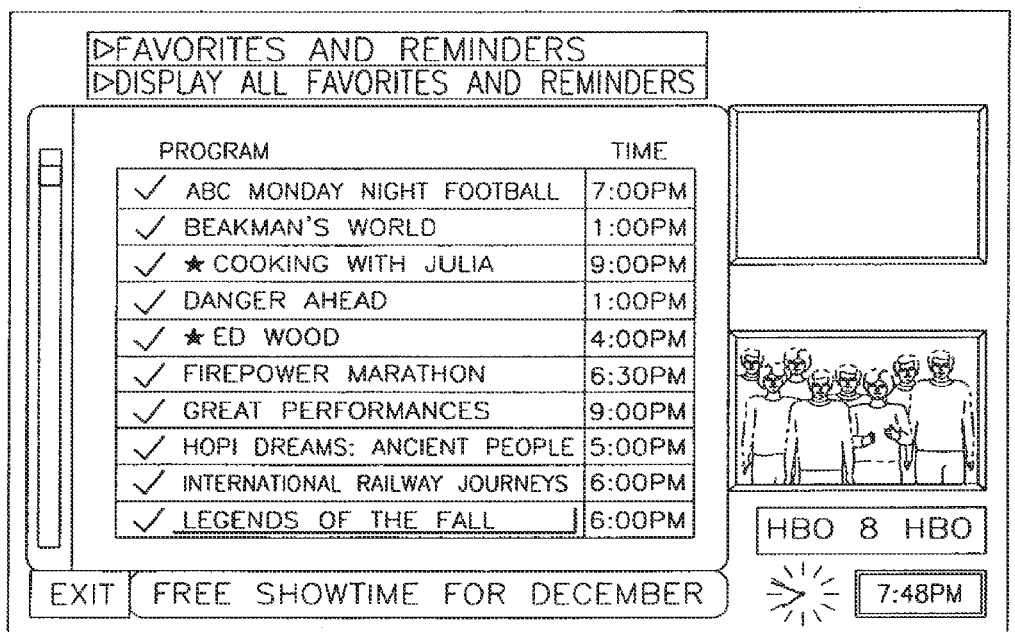

FIGS. 10A-10D illustrate a method for utilizing television schedule system to create a program reminder. Similar to the "favorites" method discussed above, an Item's InfoMenu 130 is opened and the viewer scrolls down to item (5) "Reminding when the program airs" and selects this item. A reminder submenu 160 is then activated to provide the viewer with various items for the times and number of reminders, as shown in 10B. This reminder submenu 160 can vary depending on the program's type or scheduling configuration. After specifying the recording option, a confirmation panel (not shown) will appear, allowing the viewer to o.k. the action. When the viewer has returned to the Item's InfoMenu 130 (see FIG. 10C), a reminder symbol has been added to the title and menu item (5) now gives the option to remove the program's reminder. After the program is scheduled for reminder, it is added to the "Favorites and Reminder" list, as shown in FIG. 10D.

Figure 11A:
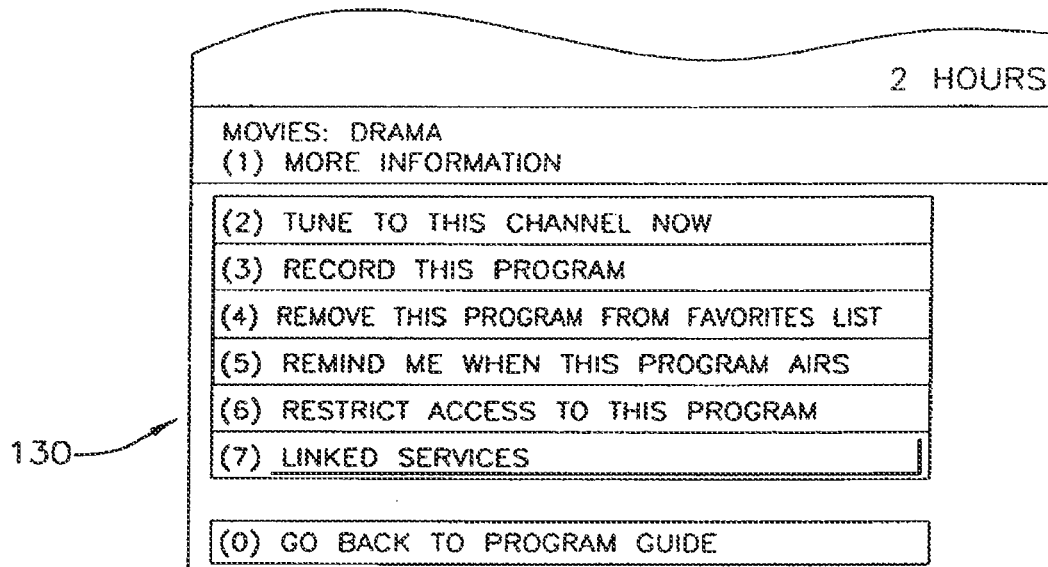
Figure 11B:
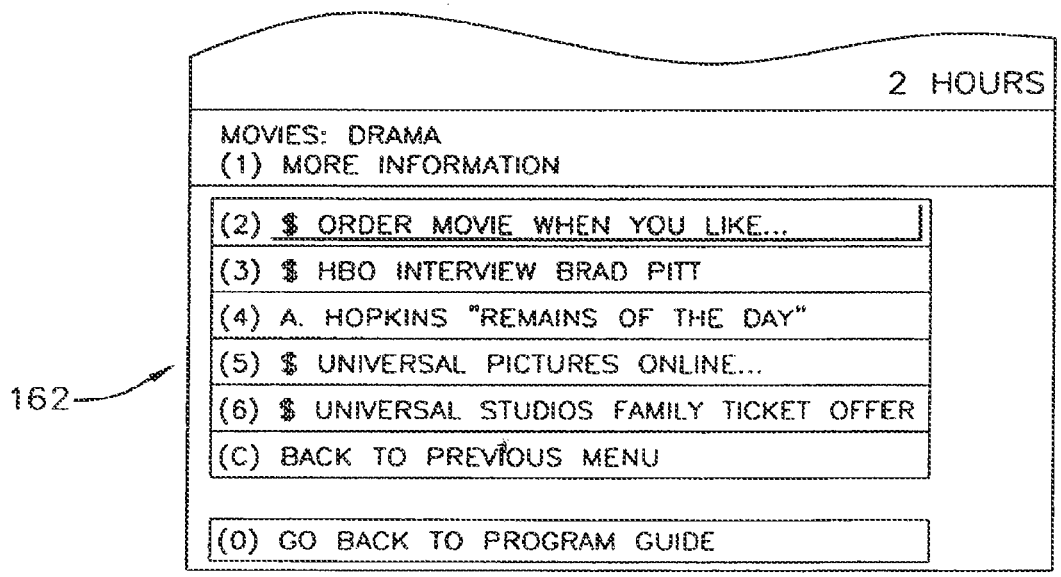

FIGS. 11A-11E illustrate a method of ordering video on demand. As shown in FIG. 10A, the viewer opens up the program's InfoMenu 130 and thumb scrolls down to the "order videos" item. The viewer is then presented with an easily scrollable matrix or menu (not shown) of movies or other programs that may be ordered. To facilitate this process, the system may include a text or feature searching program that allows the viewer to search for a particular movie, a particular type of movie, movies having a certain actor or actress, etc. Once a program has been selected, the viewer will be taken to a menu 162 associated with this program, as shown in FIG. 11B. The menu will allow the viewer to directly order the program, or order other programs, such as interviews, specials, etc., that are associated with the program. Some, denoted with a dollar sign, are purchasable. Free items would be instantly accessible to the viewer. The viewer may be prompted to a simple procedure to specify when the movie is to be delivered. When the viewer selects a particular program requiring a financial transaction, a purchasing sequence unfolds. As shown in FIG. 11C, the viewer is prompted to enter the master password/access code via the remote keypad or other means. For example, the viewer could swipe his or her credit card through slot 54 (FIG. 1). If the password/access code is accepted, the viewer is given a final opportunity to review the purchase and/or either confirm or return to the previous item menu (see FIG. 11D). When the viewer confirms his or her purchase and/or order, a receipt 170 is shown (FIG. 11E). The viewer is given the choice of returning to the previous item menu or, as always, at the very bottom item "0", to return to the program guide.

Although the foregoing invention has been described in detail for purposes of clarity, it will be obvious that certain modifications may be practiced within the scope of the appended claims. For example, the system may be configured for sorting, mixing and preparing a special customized line-up of channels within program guide 102. In addition, the viewer can automatically tune to a desired program or can select different programs for automatic recording. A detail description of suitable systems for automatic tuning and automatic recording can be found in commonly assigned U.S. Pat. No. 4,706,121 and application Ser. No. 08/423,411, the complete disclosure of which is incorporated herein by reference.

What is claimed is:

1. A method for simultaneously displaying advertisements with an electronic program guide (EPG), comprising:
   displaying a plurality of television schedule information items in a schedule information region of a display;
   receiving, at user equipment, a user selection of a schedule information item from the plurality of television schedule information items;
   accessing a remote database to identify:
      a feature associated with the selected schedule information item; and
      a program associated with the identified feature, wherein the identified program is different from a program pertaining to the selected schedule information item;
   selecting an advertisement for display from a plurality of advertisements, wherein the advertisement promotes the identified program; and
   simultaneously displaying the selected advertisement with the schedule information region.

2. The method of claim 1, wherein the displayed advertisement is interactive.

3. The method of claim 2, further comprising displaying additional information about the advertisement when the displayed interactive advertisement is selected by a user.

4. The method of claim 1, wherein the displayed plurality of television schedule information items includes the time and channel for at least a portion of the displayed television schedule information items.

5. The method of claim 1, wherein the displayed advertisement includes one or more of text, graphics, and video.

6. The method of claim 1, wherein the displayed advertisement is related to one or more of a product and a service.

7. The method of claim 6, further comprising ordering the one or more of a product and a service by selecting the displayed advertisement.

8. The method of claim 1, wherein the displayed advertisement is related to a television program.

9. The method of claim 8, further comprising tuning to the television program by selecting the displayed advertisement.

10. The method of claim 8, further comprising scheduling a recording of the television program by selecting the displayed advertisement.

11. The method of claim 1, wherein the displayed advertisement is related to a pay television program.

12. The method of claim 11, further comprising ordering the pay television program by selecting the displayed advertisement.

13. The method of claim 1, wherein the schedule information region of the display has a vertical height and wherein the selected advertisement is displayed substantially within the vertical height of the schedule information region of the display.

14. The method of claim 1, wherein the selected advertisement is displayed substantially horizontally aligned with the schedule information region.

15. The method of claim 1, wherein the feature comprises an actor or actress associated with the selected schedule information item.

16. The method of claim 1, wherein the feature comprises a program type associated with the selected schedule information item.

17. The method of claim 1, wherein the feature comprises a genre associated with the selected schedule information item.

18. A system for simultaneously displaying advertisements with an electronic program guide (EPG), the electronic program guide operative to:
   display a plurality of television schedule information items in a schedule information region of a display;
   receive, at user equipment, a user selection of a schedule information item from the plurality of television schedule information items;
   access a remote database to identify:
      a feature associated with the selected schedule information item; and a program associated with the identified feature, wherein the identified program is different from a program pertaining to the selected schedule information item;

select an advertisement for display from a plurality of advertisements, wherein the advertisement promotes the identified program; and simultaneously display the selected advertisement with the schedule information region.

19. The system of claim 18, wherein schedule information region of the display has a vertical height and wherein the selected advertisement is displayed substantially within the vertical height of the schedule information region of the display.

20. The system of claim 18, wherein the selected advertisement is displayed substantially horizontally aligned with the schedule information region.

* * * * *